US012574906B2

(12) United States Patent (10) Patent No.: US 12,574,906 B2
Elshafie et al. (45) Date of Patent: Mar. 10, 2026

(54) REPETITION FACTOR ADAPTATION FOR MINI-SLOT-BASED TRANSPORT BLOCK TRANSMISSION

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 18/058,505

(22) Filed: Nov. 23, 2022

(65) Prior Publication Data

US 2024/0172194 A1 May 23, 2024

(51) Int. Cl.
*H04W 72/04* (2023.01)
*H04L 5/00* (2006.01)
*H04W 72/0446* (2023.01)
*H04W 72/40* (2023.01)

(52) U.S. Cl.
CPC ....... *H04W 72/0446* (2013.01); *H04L 5/0055* (2013.01); *H04W 72/40* (2023.01)

(58) Field of Classification Search
CPC . H04W 92/18; H04W 72/0446; H04W 72/02; H04W 76/14; H04W 76/20
See application file for complete search history.

(56) References Cited

U.S. PATENT DOCUMENTS

| | | | | |
|---|---|---|---|---|
| 12,082,207 B2 * | 9/2024 | Li | .......................... | H04W 72/23 |
| 2021/0227604 A1 * | 7/2021 | Huang | ................ | H04W 40/248 |
| 2022/0271880 A1 | 8/2022 | Choi | | |
| 2024/0137970 A1 * | 4/2024 | Rastegardoost | ...... | H04W 72/40 |

FOREIGN PATENT DOCUMENTS

| | | | | |
|---|---|---|---|---|
| WO | 2022175894 A1 | 8/2022 | | |
| WO | WO-2023210974 A1 * | 11/2023 | ............ | H04W 72/02 |
| WO | WO-2024211628 A1 * | 10/2024 | ........... | H04L 5/0007 |

OTHER PUBLICATIONS

International Search Report and Written Opinion—PCT/US2023/080716—ISA/EPO—Jun. 26, 2024.
International Search Report and Written Opinion—PCT/US2023/080716—ISA/EPO—Mar. 13, 2024.

* cited by examiner

*Primary Examiner* — Shukri Taha
(74) *Attorney, Agent, or Firm* — Shumaker & Sieffert, P.A.

(57) ABSTRACT

Techniques related to wireless communication are disclosed. Some aspects of the disclosure relate to devices comprising a processing system configured to obtain first data, wherein the first data is obtained from a second wireless device, comprises reliability or rate requirements, an initial resource pool configuration, a priority, quality of service (QoS), or a remaining packet delay budget (PDB). Each transmission type of the plurality of transmission types is a different pattern of organizing data into mini-slots reserved for sidelink transmission. The processing system is configured to output, for transmission to a second wireless device and according to the determined transmission type, the data in one or more mini-slots reserved for sidelink transmission.

23 Claims, 13 Drawing Sheets

1200

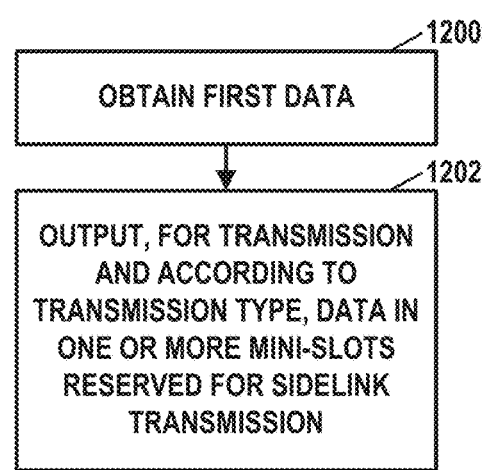

OBTAIN FIRST DATA

1202

OUTPUT, FOR TRANSMISSION AND ACCORDING TO TRANSMISSION TYPE, DATA IN ONE OR MORE MINI-SLOTS RESERVED FOR SIDELINK TRANSMISSION

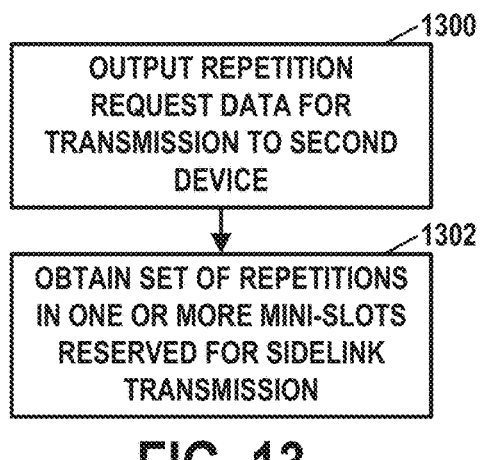

OUTPUT REPETITION REQUEST DATA FOR TRANSMISSION TO SECOND DEVICE

1302

OBTAIN SET OF REPETITIONS IN ONE OR MORE MINI-SLOTS RESERVED FOR SIDELINK TRANSMISSION

OUTPUT INDICATION OF TRANSMISSION TYPE TO SECOND DEVICE

1402

ALLOCATE RESOURCES TO SECOND DEVICE FOR USE FOR SIDELINK TRANSMISSION

FIG. 14

REPETITION FACTOR ADAPTATION FOR MINI-SLOT-BASED TRANSPORT BLOCK TRANSMISSION

TECHNICAL FIELD

The technology discussed below relates generally to wireless communication systems.

BACKGROUND

In a wireless communication system, interference or other factors may cause transmitted data to be corrupted or lost. Accordingly, techniques are implemented in wireless communication systems for detecting corruption or loss of transmitted data. For example, a transmitting device may include error checking codes, such as cyclic redundancy check (CRC) codes in the transmitted data. A receiving device may process the error checking codes to determine whether the transmitted data is corrupted. The receiving device may respond to the transmitting device with a positive acknowledgment message (ACK) to indicate successful receipt or a negative acknowledgment message (NACK) to indicate unsuccessful receipt. In some instances, the transmitting device does not wait for a NACK message to automatically repeat transmission of the data. Preemptively repeating transmission of the data in this way may reduce lag associated with sending ACK and NACK messages.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. And unless expressly described, no one aspect or feature is essential to achieve technical effects or solutions discussed herein.

In one example, a system is described for adapting a transmission type used for transmitting data in mini-slots reserved for sidelink transmission. For instance, a transmitting wireless device may include a processing system configured to determine a transmission type from a plurality of transmission types. Each transmission type of the plurality of transmission types is a different pattern of organizing data into mini-slots reserved for sidelink transmission. The processing system is configured to output, for transmission to a second wireless device and according to the determined transmission type, the data in one or more mini-slots reserved for sidelink transmission. For example, the processing system may obtain first data. The first data may be obtained from a second wireless device, the first data may indicate reliability or rate requirements, the first data may indicate an initial resource pool configuration, and/or the first data may indicate a priority, quality of service (QoS), or remaining packet delay budget (PDB). In this example, the transmission type may be dependent on the first data.

Determining the transmission type for transmitting data in the mini-slots may enhance the reduce delays in transmitting the data. In this disclosure, a wireless device is a device configured to perform wireless communication. Example wireless devices may include base stations, user equipment, access points, wireless nodes, and so on.

In some examples, this disclosure describes an apparatus for wireless communication, comprising: one or more processors; and a memory comprising instructions executable by the one or more processors, wherein the one or more processors are configured to: obtain first data, wherein at least one of: the first data is obtained from a second wireless device, the first data indicates reliability or rate requirements, the first data indicates an initial resource pool configuration, the first data indicates a priority, the first data indicates a quality of service (QoS), or the first data indicates a remaining packet delay budget (PDB); output, for transmission to a receiving wireless device and according to a transmission type in a plurality of transmission types, second data in one or more mini-slots reserved for sidelink transmission, wherein: the transmission type is dependent on the first data, and each transmission type of the plurality of transmission types is a different pattern of organizing the second data into the one or more mini-slots reserved for sidelink transmission.

In another example, this disclosure describes a method of wireless communication at a first wireless device, comprising: obtaining first data, wherein at least one of: the first data is obtained from a second wireless device, the first data indicates reliability or rate requirements, the first data indicates an initial resource pool configuration, the first data indicates a priority, the first data indicates a quality of service (QoS), or the first data indicates a remaining packet delay budget (PDB); outputting, for transmission to a receiving wireless device and according to a transmission type in a plurality of transmission types, second data in one or more mini-slots reserved for sidelink transmission, wherein: the transmission type is dependent on the first data, and each transmission type of the plurality of transmission types is a different pattern of organizing the second data into the one or more mini-slots reserved for sidelink transmission.

In another example, this disclosure describes an apparatus for wireless communication, comprising: one or more processors; and a memory comprising instructions executable by the one or more processors, wherein the one or more processors are configured to: output, for provision to a second wireless device, an indication of a transmission type of a plurality of transmission types, each transmission type of the plurality of transmission types is a different pattern of organizing data into mini-slots reserved for sidelink transmission; and allocate resources to be used for sidelink communication by the second wireless device.

In another example, this disclosure describes a method of wireless communication at a first wireless device, comprising: outputting, for provision to a second wireless device, an indication of a transmission type in a plurality of transmission types, each transmission type of the plurality of transmission types is a different pattern of organizing data into mini-slots reserved for sidelink transmission; and allocating resources to the second wireless device to use for sidelink transmission.

In another example, this disclosure describes an apparatus for wireless communication, comprising: one or more processors; and a memory comprising instructions executable by the one or more processors, wherein the one or more processors are configured to: output repetition request data for transmission to a second wireless device, the repetition request data indicating a quantity of repetitions of a transport block (TB); and obtain from the second wireless device, a set of repetitions of the TB in one or more mini-slots reserved for sidelink transmission, wherein the set of repetitions of the TB includes the quantity of repetitions of the TB.

In another example, this disclosure describes a method of wireless communication at a first wireless device, comprising: outputting repetition request data for transmission to a second wireless device, the repetition request data indicating a quantity of repetitions of a transport block (TB); and obtaining, from the second wireless device, a set of repetitions of the TB in one or more mini-slots reserved for sidelink transmission, wherein the set of repetitions of the TB includes the quantity of repetitions of the TB.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

BRIEF DESCRIPTION OF THE DRAWINGS

FIG. 12 is a flowchart illustrating an example operation of a transmitting UE (Tx-UE) according to techniques of this disclosure.

FIG. 13 is a flowchart illustrating an example operation of a receiving UE (Rx-UE) according to techniques of this disclosure.

FIG. 14 is a flowchart illustrating an example operation of a device according to techniques of this disclosure.

DETAILED DESCRIPTION

Figure 1:
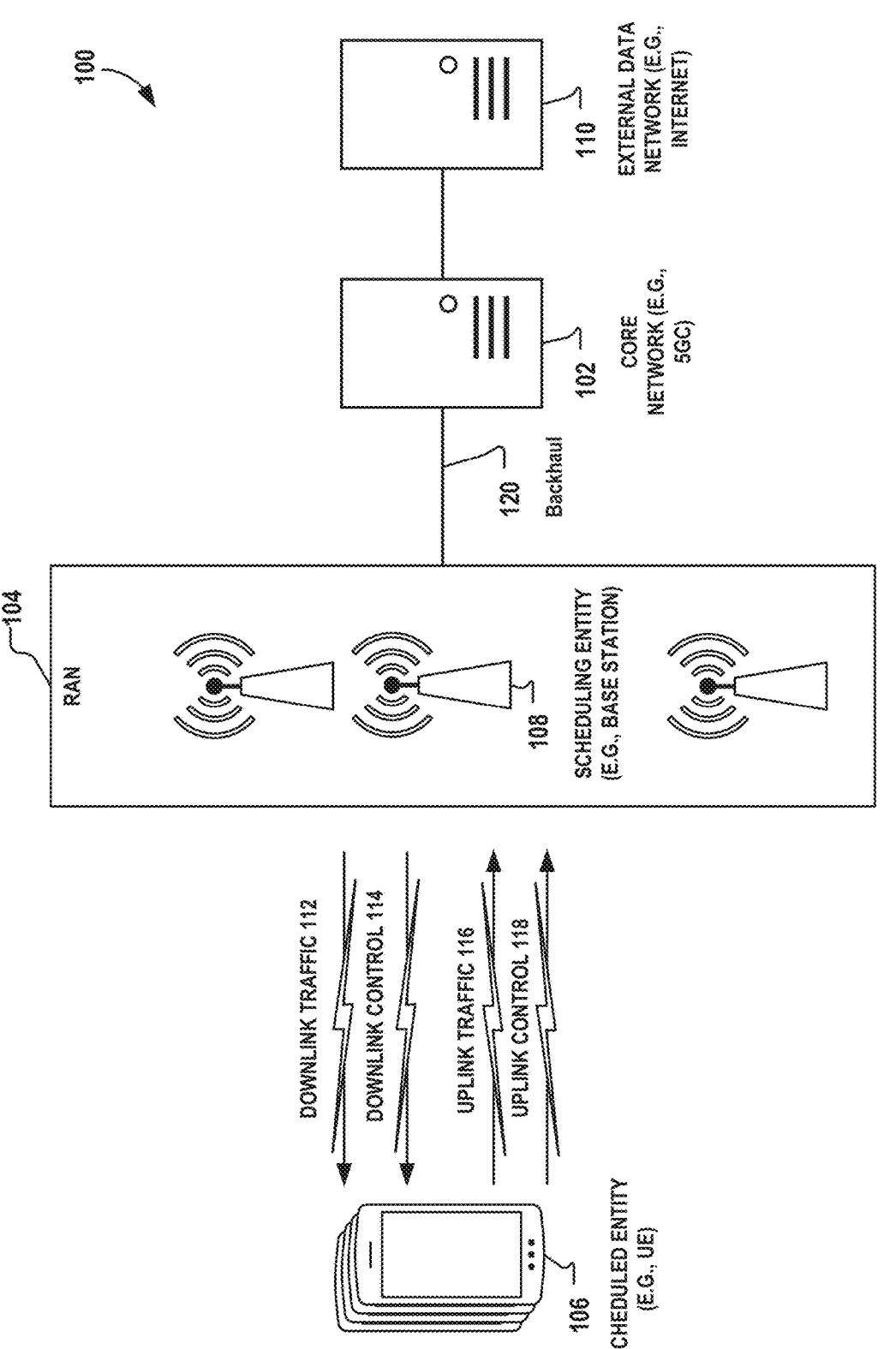
FIG. 1 is a schematic illustration of a wireless communication system according to some aspects of this disclosure.

Because data can be lost or corrupted during transmission, a transmitting device may include error checking codes, such as cyclic redundancy check (CRC) codes in the transmitted data. For example, in 5G wireless communication, a transport block (TB) is a packet of data that is passed between a Media Access Control (MAC) layer and a Physical layer of a protocol stack. A TB includes a payload and a CRC code.

A receiving device may process the error checking codes to determine whether the transmitted data is corrupted. The receiving device may respond to the transmitting device with a positive acknowledgment message (ACK) to indicate successful receipt or a negative acknowledgment message (NACK) to indicate unsuccessful receipt. In some instances, the transmitting device does not wait for a NACK message to automatically repeat transmission of the data. Preemptively repeating transmission of the data in this way may reduce lag associated with sending ACK and NACK messages. That is, if the transmitting device transmits the same data two or more times in quick succession, chances are relatively higher that the receiving device successfully receives the data before the receiving device has a chance to send a NACK message to the transmitting device and the transmitting device to respond to the NACK message by retransmitting the data to the receiving device. A repetition factor represents the quantity of times the transmitting device preemptively repeats transmission of the data. However, preemptively repeating transmission of data may consume extra bandwidth and energy.

In 5G wireless communication, a slot is a time period in which data can be transmitted. In some releases of the 5G standard, a slot may be divided into mini-slots. The use of mini-slots may be advantageous in some situations, such as situations in which Transmitting User Equipment (Tx-UEs) transmit Transport Blocks (TBs) that are small enough not to require complete slots. Thus, the use of mini-slots may allow multiple TBs to be transmitted within a single slot. The use of mini-slots may therefore facilitate delay-stringent applications and services, such as Industrial Internet of Things (IIoT) applications, Ultra Reliable Low Latency Communication (URLLC) applications, and Extended Reality (XR) applications. Transmitting TBs in mini-slots may be especially useful when transmitting data in a sidelink channel. The sidelink channel enables communication directly between two UEs, rather than communication between two UEs via a third wireless device, such as a base station.

A Tx-UE may transmit TBs in mini-slots according to a variety of transmission types. When the data is organized into mini-slots according to the first transmission type, the one or more mini-slots include multiple mini-slots of one or more slots and are used for transmission of a transport block (TB) containing the second data. When the data is organized into mini-slots according to the second transmission type, a TB containing the data is repeated with a same or different redundancy version (RV) in different ones of the mini-slots. When the data is organized into mini-slots according to the third transmission type, a slot includes a first set of one or more of the mini-slots and a second set of one or more of the mini-slots, the data includes third data and fourth data, and a first TB containing the third data is transmitted in the first set of mini-slots and a second TB containing the fourth data is transmitted in the second set of mini-slot.

This disclosure describes techniques in a Tx-UE that may determine which of the transmission types to use for transmitting TBs to a receiving UE (Rx-UE) via a sidelink channel. For instance, the Tx-UE may determine a transmission type from a plurality of transmission types, where each transmission type of the plurality of transmission types is a different pattern of organizing data into mini-slots reserved for sidelink transmission. The Tx-UE may transmit, to a second wireless device, the data in one or more of the mini-slots reserved for sidelink transmission according to the determined transmission type. Additionally, this disclosure describes techniques in which the Tx-UE and Rx-UE may determine a repetition factor to use for repeating transmission of TBs. Determining the transmission type and repetition factor for transmitting data in the mini-slots may reduce delays and may make better use of bandwidth resources.

The disclosure that follows presents various concepts that may be implemented across a broad variety of telecommunication systems, network architectures, and communication standards. FIG. 1 is a schematic illustration of a wireless communication system according to some aspects of this disclosure. Referring now to FIG. 1, as an illustrative example without limitation, this schematic illustration shows various aspects of the present disclosure with reference to a wireless communication system 100. Wireless communication system 100 includes several interacting domains: a core network 102, a radio access network (RAN) 104, and a scheduled entity. The scheduled entity may be any type of device on a schedule of devices configured for transmitting and receiving data in wireless communication system 100. User equipment (UE) is a common form of scheduled entity. Accordingly, for ease of explanation, this disclosure refers to the scheduled entity as UE. FIG. 1 shows scheduled entity 106 as user equipment (UE). By virtue of wireless communication system 100, the UE may be enabled to carry out data communication with an external data network 110, such as (but not limited to) the Internet.

RAN 104 may implement any suitable wireless communication technology or technologies to provide radio access to scheduled entity 106. As one example, RAN 104 may operate according to 3rd Generation Partnership Project (3GPP) New Radio (NR) specifications, often referred to as 5G or 5G NR. In some examples, RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, RAN 104 includes a plurality of scheduling entities 108, such as base stations. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an evolved Node B (eNB), a gNode B (gNB), a 5G NB, a transmit receive point (TRP), or some other suitable terminology.

RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), a vehicle, and a broad array of embedded systems, e.g., corresponding to an "Internet of things" (IoT). A mobile apparatus, such as a UE, may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; and agricultural equipment; etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data. A mobile apparatus may additionally include two or more disaggregated devices in communication with one another, including, for example, a wearable device, a haptic sensor, a limb movement sensor, an eye movement sensor, etc., paired with a smartphone. In various examples, such disaggregated devices may communicate directly with one another over any suitable communication channel or interface, or may indirectly communicate with one another over a network (e.g., a local area network or LAN).

Wireless communication between RAN 104 and scheduled entity 106 may be described as utilizing an air interface. Transmissions over the air interface from a base station (e.g., one of scheduling entities 108) to one or more UEs (e.g., scheduled entity 106) may be referred to as downlink (DL)

transmission. In accordance with certain aspects of the present disclosure, the term downlink may refer to a point-to-multipoint transmission originating at one of scheduling entities 108 (e.g., a base station). Another way to describe this scheme may be to use the term broadcast channel multiplexing. Transmissions from a UE (e.g., scheduled entity 106) to a base station (e.g., one of scheduling entities 108) may be referred to as uplink (UL) transmissions. In accordance with further aspects of the present disclosure, the term uplink may refer to a point-to-point transmission originating at scheduled entity 106 (e.g., a UE).

In some examples, access to the air interface may be scheduled, wherein one or more of scheduling entities 108 (e.g., a network node) allocates resources for communication among some or all devices and equipment within its service area or cell. Within the present disclosure, as discussed further below, a scheduling entity may be responsible for scheduling, assigning, reconfiguring, and releasing resources for one or more scheduled entities. That is, for scheduled communication, UEs 106, which may be scheduled entities, may utilize resources allocated by the scheduling entity.

Base stations are not the only entities that may function as scheduling entities. That is, in some examples, a UE or network node may function as a scheduling entity, scheduling resources for one or more scheduled entities (e.g., one or more UEs).

As illustrated in FIG. 1, a network node (e.g., one or more of scheduling entities 108) may broadcast downlink traffic 112 to one or more UEs 106. Broadly, the network node is a node or device responsible for scheduling traffic in a wireless communication network, including downlink traffic 112 and, in some examples, uplink traffic 116 from one or more scheduled entities (e.g., scheduled entity 106) to the network node. On the other hand, scheduled entity 106 (e.g., a UE) is a node or device that receives downlink control information 114, including but not limited to scheduling information (e.g., a grant), synchronization or timing information, or other control information from another entity in the wireless communication network such as the network node.

Network nodes (such as scheduling entities 108) may include a backhaul interface for communication with a backhaul portion 120 of the wireless communication system. Backhaul portion 120 may provide a link between a network node and core network 102. Further, in some examples, a backhaul network may provide interconnection between the respective network nodes. Various types of backhaul interfaces may be employed, such as a direct physical connection, a virtual network, or the like using any suitable transport network.

Core network 102 may be a part of wireless communication system 100, and may be independent of the radio access technology used in RAN 104. In some examples, core network 102 may be configured according to 5G standards (e.g., 5GC). In other examples, the core network 102 may be configured according to a 4G evolved packet core (EPC), or any other suitable standard or configuration.

Figure 2:
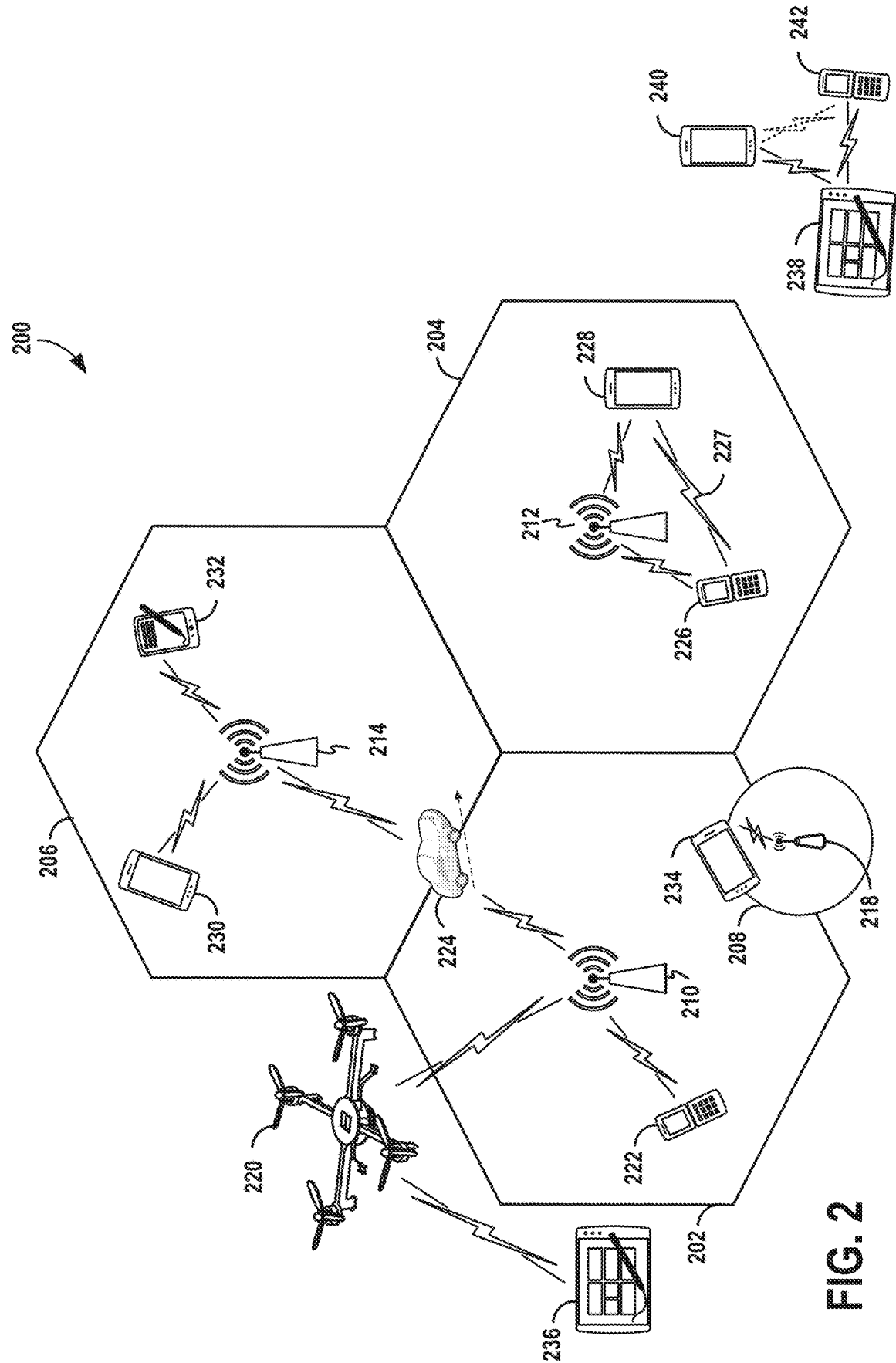
FIG. 2 is a conceptual illustration of an example of a radio access network according to some aspects of this disclosure.

FIG. 2 provides a schematic illustration of a RAN 200, by way of example and without limitation. In some examples, RAN 200 may be the same as RAN 104 described above and illustrated in FIG. 1. The geographic area covered by RAN 200 may be divided into cellular regions (cells) that a UE can uniquely identify based on an identification broadcasted from one access point, base station, or network node. FIG. 2 illustrates macrocells 202, 204, and 206, and a small cell 208.

FIG. 2 shows two three network nodes 210, and 212, and 214 in cells 202, 204, and 206. In the illustrated example, cells 202, 204, and 206 may be referred to as macrocells, because network nodes 210, 212, and 214 support cells having a large size. Further, a network node 218 is shown in small cell 208 (e.g., a microcell, picocell, femtocell, home base station, home Node B, home eNode B, etc.) which may overlap with one or more macrocells. In this example, small cell 208 may be referred to as a small cell, because network node 218 supports a cell having a relatively small size. Cell sizing can be done according to system design as well as component constraints.

RAN 200 may include any quantity of wireless network nodes and cells. Further, RAN 200 may include a relay node to extend the size or coverage area of a given cell. Network nodes 210, 212, 214, 218 provide wireless access points to a core network for any quantity of mobile apparatuses. In some examples, network nodes 210, 212, 214, and/or 218 may be the same as scheduling entities 108 described above and illustrated in FIG. 1.

FIG. 2 further includes an unmanned aerial vehicle (UAV) 220, such as a quadcopter or drone, which may be configured to function as a network node. That is, in some examples, a cell may not necessarily be stationary, and the geographic area of the cell may move according to the location of a mobile network node such as UAV 220.

Within RAN 200, each of network nodes 210, 212, 214, 218, and UAV 220 may be configured to provide an access point to a core network 102 (see FIG. 1) for all the UEs in the respective cells. For example, UEs 222 and 224 may be in communication with network node 210; UEs 226 and 228 may be in communication with network node 212; UEs 230 and 232 may be in communication with network node 214; UE 234 may be in communication with network node 218; and UE 236 may be in communication with a mobile network node, such as UAV 220. In some examples, UEs 222, 224, 226, 228, 230, 232, 234, 236, 238, 240, and/or 242 may be the same as the UE/scheduled entity 106 described above and illustrated in FIG. 1.

In some examples, a mobile network node (e.g., UAV 220) may be configured to function as a UE. For example, UAV 220 may operate within cell 202 by communicating with network node 210.

In a further aspect of RAN 200, sidelink signals may be used between UEs without necessarily relying on scheduling or control information from a network node (e.g., a scheduling entity). For example, two or more UEs (e.g., UEs 226 and 228) may communicate with each other using peer to peer (P2P) or sidelink signals 227 without relaying that communication through a network node. In a further example, UE 238 is illustrated communicating with UEs 240 and 242. Here, UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with a scheduling entity, such as UE 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In order for transmissions over the radio access network 200 to obtain a low block error rate (BLER) while still achieving very high data rates, a transmitter may use channel coding. That is, wireless communication may generally utilize a suitable error correcting block code. In a typical block code, a transmitter splits up an information message or sequence into code blocks (CBs), and an encoder (e.g., a CODEC) at the transmitting device then mathematically adds redundancy to the information message. Exploitation of this redundancy in the encoded information message can improve the reliability of the message, enabling correction for bit errors that may occur due to the noise.

In 5G NR specifications (Release 15), data is coded in differing manners. User data (e.g., data, data traffic, traffic, etc.) may be coded using quasi-cyclic low-density parity check (LDPC) with two different base graphs. One base graph is used for large code blocks and/or high code rates, while another base graph is used otherwise. Control information and the physical broadcast channel (PBCH) may be coded using Polar coding (e.g., based on nested sequences). For the control information and the PBCH, puncturing, shortening, and repetition are used for rate matching.

Those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to network node 210, and for multiplexing for DL transmissions from network node 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a network node may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3A:
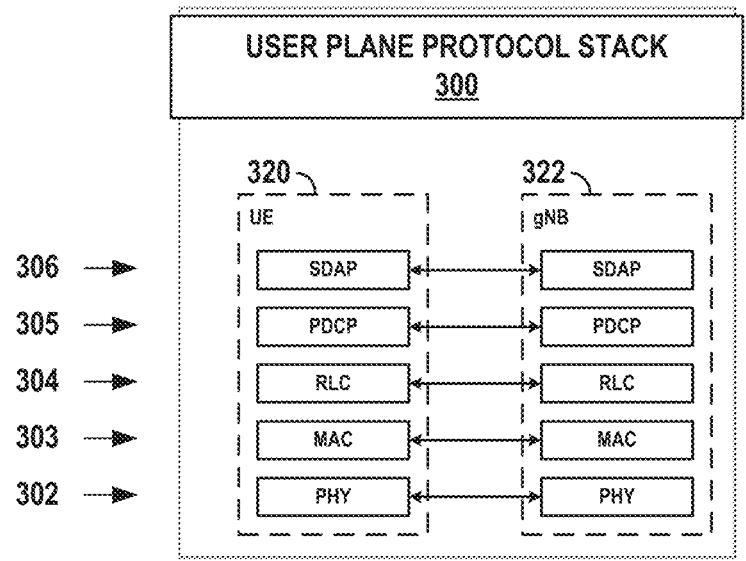
FIG. 3A is a schematic illustration of a user plane protocol stack and a control plane protocol stack in accordance with some aspects of this disclosure.
Figure 3A:
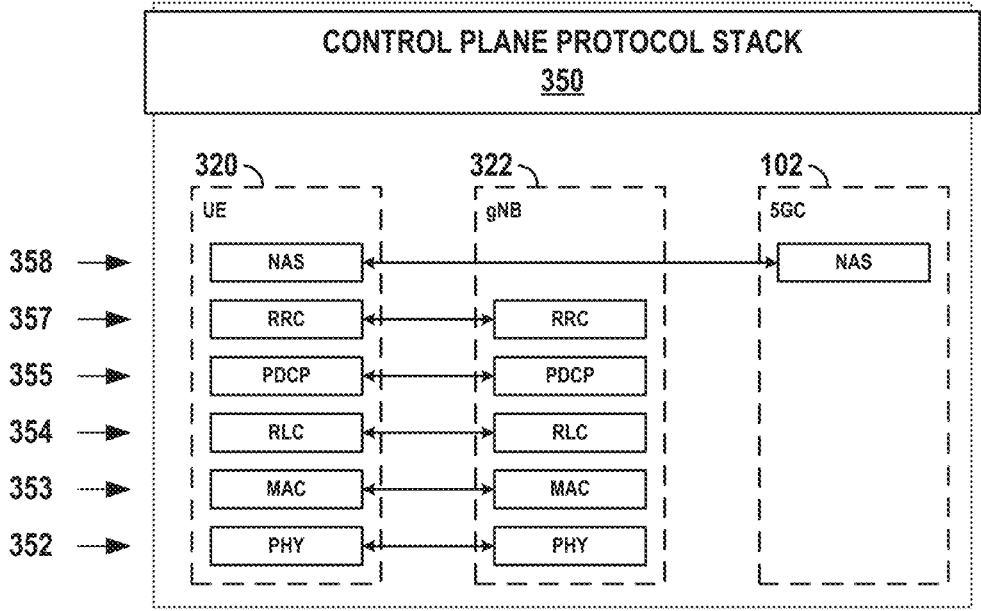

FIG. 3A is a schematic illustration of a user plane protocol stack 300 and a control plane protocol stack 350 in accordance with some aspects of this disclosure. In a wireless telecommunication system, the communication protocol architecture may take on various forms depending on the application. For example, in a 3GPP NR system, the signaling protocol stack is divided into Non-Access Stratum (NAS 358) and Access Stratum (AS 302-306 and 352-357) layers and protocols. A NAS protocol 358 provides upper layers, for signaling between scheduled entity 106 and core network 102 (referring to FIG. 1). The AS protocol 302-306 and

352-357 provides lower layers, for signaling between RAN 104 (e.g., a gNB, network node, or scheduling entities 108) and scheduled entity 106.

Radio bearers between a network node (e.g., one of scheduling entities 108) and scheduled entity 106 may be categorized as data radio bearers (DRB) for carrying user plane data, corresponding to user plane protocol stack 30; and signaling radio bearers (SRB) for carrying control plane data, corresponding to control plane protocol stack 350.

In the AS, protocols of both user plane protocol stack 300 and control plane protocol stack 350 include a physical layer (PHY) 302/352, a medium access control layer (MAC) 303/353, a radio link control layer (RLC) 304/354, and a packet data convergence protocol layer (PDCP) 305/355. PHY 302/352 is the lowest layer and implements various physical layer signal processing functions. MAC layer 303/353 provides multiplexing between logical and transport channels and is responsible for various functions. For example, the MAC layer 303/353 is responsible for reporting scheduling information, priority handling and prioritization, and error correction through hybrid automatic repeat request (HARQ) operations. RLC layer 304/354 provides functions such as sequence numbering, segmentation and reassembly of upper layer data packets, and duplicate packet detection. PDCP layer 305/355 provides functions including header compression for upper layer data packets to reduce radio transmission overhead, security by ciphering the data packets, and integrity protection and verification.

In user plane protocol stack 300, a service data adaptation protocol (SDAP) layer 306 provides services and functions for maintaining a desired quality of service (QoS). In control plane protocol stack 350, a radio resource control (RRC) layer 357 includes a quantity of functional entities for routing higher layer messages, handling broadcasting and paging functions, establishing and configuring radio bearers, NAS message transfer between NAS and UE, etc.

NAS protocol 358 provides for a wide variety of control functions between scheduled entity 106 and core network 102. These functions include, for example, registration management functionality, connection management functionality, and user plane connection activation and deactivation.

Figure 4:
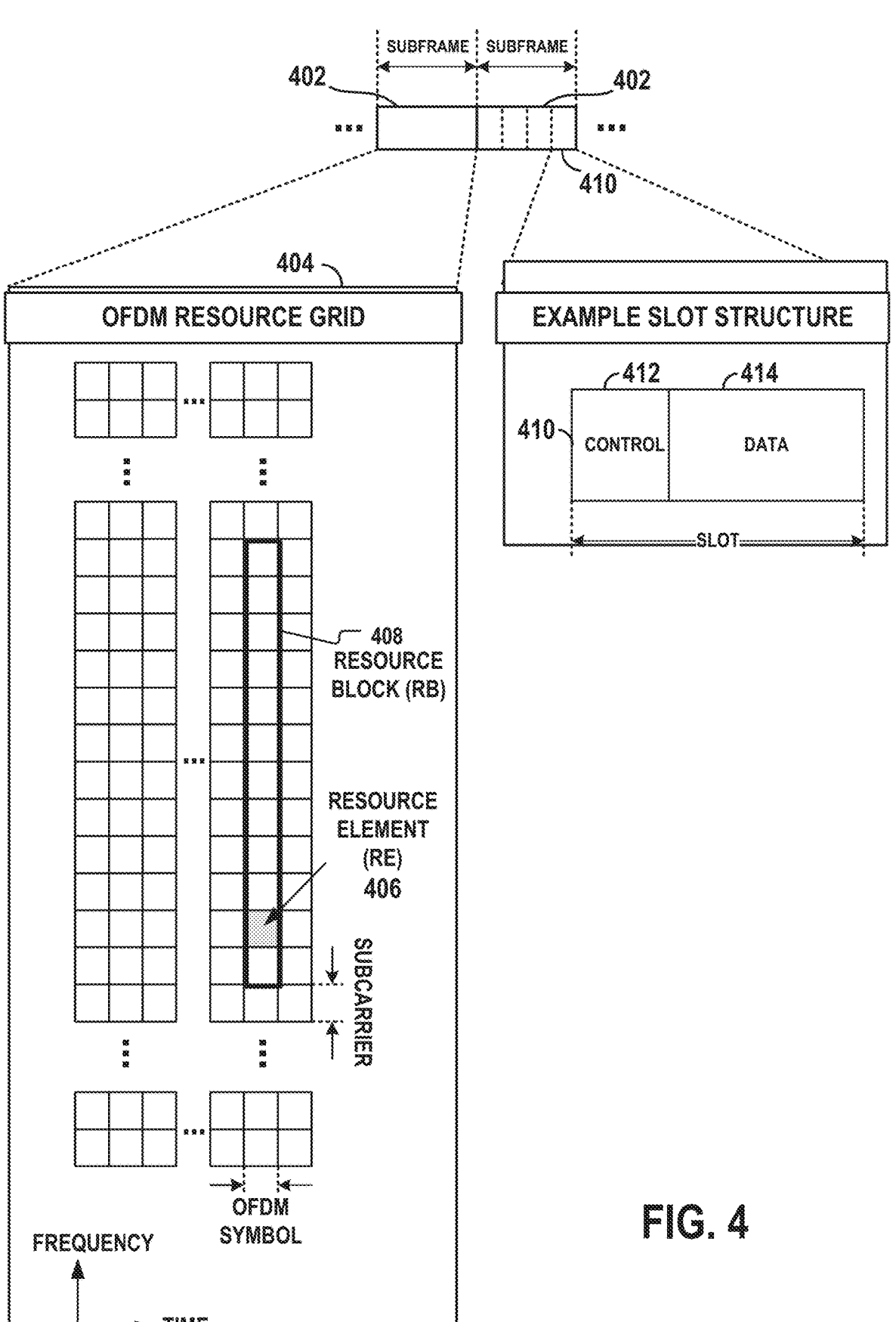
FIG. 4 schematically illustrates various aspects of the present disclosure with reference to an Orthogonal Frequency Division Multiplexing (OFDM) waveform.

FIG. 4 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

In some examples, a frame may refer to a predetermined duration of time (e.g., 10 ms) for wireless transmissions. Further, each frame may include a set of subframes (e.g., 10 subframes of 1 ms each). A given carrier may include one set of frames in the UL, and another set of frames in the DL. FIG. 4 illustrates an expanded view of an exemplary DL subframe 402, showing an OFDM resource grid 404. However, as those skilled in the art will readily appreciate, the PHY transmission structure for any application may vary from the example described here, depending on any quantity of factors. Here, time is in the horizontal direction with units of OFDM symbols; and frequency is in the vertical direction with units of subcarriers or tones.

Resource grid 404 may schematically represent time-frequency resources for a given antenna port. That is, in a MIMO implementation with multiple antenna ports available, a corresponding multiple number of resource grids 404 may be available for communication. Resource grid 404 is divided into multiple resource elements (REs) 406. An RE, which is 1 subcarrier×1 symbol, is the smallest discrete part of the time-frequency grid and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may span 12 subcarriers, a number independent of the numerology used. In some examples, depending on the numerology, an RB may include any suitable number of consecutive OFDM symbols in the time domain.

A given UE generally utilizes only a subset of resource grid 404. An RB may be the smallest unit of resources that a scheduler can allocate to a UE. Thus, the more RBs scheduled for a UE, and the higher the modulation scheme chosen for the air interface, the higher the data rate for the UE.

In this illustration, RB 408 occupies less than the entire bandwidth of subframe 402, with some subcarriers illustrated above and below RB 408. In a given implementation, subframe 402 may have a bandwidth corresponding to any number of one or more RBs 408. Further, RB 408 is shown occupying less than the entire duration of subframe 402, although this is merely one possible example.

Each 1 ms subframe 402 may include one or multiple adjacent slots. In FIG. 4, one subframe 402 includes four slots 410, as an illustrative example. In some examples, a slot may be defined according to a specified quantity of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A network node may in some cases transmit these mini-slots occupying resources scheduled for ongoing slot transmissions for the same or for different UEs.

An expanded view of one of slots 410 illustrates slot 410 including a control region 412 and a data region 414. In general, control region 412 may carry control channels (e.g., PDCCH), and data region 414 may carry data channels (e.g., PDSCH or PUSCH). Of course, a slot may contain all DL, all UL, or at least one DL portion and at least one UL portion. The structure illustrated in FIG. 4 is merely exemplary in nature, and different slot structures may be utilized, and may include one or more of each of the control region(s) and data region(s).

Although not illustrated in FIG. 4, the various REs 406 within RB 408 may carry one or more physical channels, including control channels, shared channels, data channels, etc. Other REs 406 within RB 408 may also carry pilots or reference signals. These pilots or reference signals may provide for a receiving device to perform channel estimation of the corresponding channel, which may enable coherent demodulation/detection of the control and/or data channels within RB 408.

In a DL transmission, the transmitting device (e.g., a network node, such as one of scheduling entities 108) may allocate one or more REs 406 (e.g., within a control region 412) to carry one or more DL control channels. These DL control channels include DL control information 114 (DCI) that generally carries information originating from higher layers, such as a physical broadcast channel (PBCH), a physical downlink control channel (PDCCH), etc., to one or more UEs 106. In addition, the network node may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A network node may transmit the synchronization signals PSS and SSS (collectively referred to as SS), and in some examples, the PBCH, in an SS block that includes 4 consecutive OFDM symbols. In the frequency domain, the SS block may extend over 240 contiguous subcarriers. Of course, the present disclosure is not limited to this specific SS block configuration. Other nonlimiting examples may utilize greater or fewer than two synchronization signals; may include one or more supplemental channels in addition to the PBCH; may omit a PBCH; and/or may utilize non-consecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a UE) may utilize one or more REs 406 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the network node, such as one of scheduling entities 108) to schedule uplink transmissions. Here, in response to the SR transmitted on the UL control channel 118 (e.g., a PUCCH), the network node may transmit downlink control information (DCI) 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 4 are not necessarily all the channels or carriers that may be utilized between a network node (e.g., one of scheduling entities 108) and scheduled entity 106, and those of ordinary skill in the art will recognize that other channels or carriers may be utilized in addition to those illustrated, such as other traffic, control, and feedback channels.

For example, device-to-device (D2D) communication may employ a different set of channels or resources. D2D, or point-to-point (P2P) communication enables discovery of, and communication with nearby devices using a direct link between the devices (i.e., without passing through a base station, relay, or other network node). D2D can enable mesh networks, and device-to-network relay functionality. Some examples of D2D technology include Bluetooth, Wi-Fi Direct, Miracast, LTE-D, and sidelink communication.

Sidelink communication may be provided over a PC5 interface, which employs PC5 protocols for D2D communication. Other suitable protocols may be utilized for sidelink communication within the scope of this disclosure.

Resource allocation for wireless resources in a sidelink resource pool may employ one of two modes, referred to herein as mode 1 and mode 2. In mode 1, which may be referred to as scheduled resource allocation, the sidelink resource allocation is provided by the RAN. In mode 2, which may be referred to as UE autonomous resource allocation, a UE decides the sidelink transmission resources and timing in the sidelink resource pool.

Resource allocation mode 1 may generally be managed by a network node (e.g., a gNB). In some examples, a UE may transmit sidelink buffer status report (BSR) to a network node to support scheduling of sidelink resources via resource allocation mode 1. A sidelink BSR indicates that a UE has data buffered or ready for transmission over sidelink to a destination UE. And in some examples, a network node may use one of several different types of sidelink grants.

With a type-1 sidelink grant, which may be referred to as a static grant, a network node may employ higher-layer (e.g., RRC) signaling to provide a persistent sidelink grant for sidelink communication.

With a type-2 sidelink grant, which may be referred to as a semi-static grant or a configured grant, a network node may employ higher-layer (e.g., RRC) signaling to define the resources of a configured sidelink grant, and may then transmit a suitable signal (e.g., DCI or MAC-CE) to either activate or deactivate the configured sidelink grant. Here, the activation signal for a configured grant may indicate a quantity of repetitions for a UE to use for a sidelink transmission. That is, an activation signal for a configured sidelink grant may instruct a UE to perform a configured quantity of blind retransmissions of a sidelink transmission based on the configured grant. Here, a blind retransmission refers to a retransmission (e.g., a HARQ retransmission) of a message or packet without necessarily being informed (e.g., by a HARQ-NACK) that the packet was not successfully received and decoded. In various examples, a RAN may support any suitable number of blind retransmissions of sidelink data. The quantity of blind retransmissions used in a given application may depend, for example, on QoS requirements, desired reliability or latency of communication, etc.

With a dynamic grant, a network node may transmit a suitable DCI that itself includes a sidelink grant. Because a dynamic grant may arrive at essentially any time, a UE may continuously monitor the PDCCH for such dynamic sidelink grant DCIs. Similar to the case for a configured grant, in some examples, a dynamic sidelink grant may instruct a UE to perform a configured quantity of blind retransmissions of a sidelink transmission.

With resource allocation mode 2 a UE may autonomously, or on its own, select resources for sidelink transmissions from a sidelink resource pool designated by the RAN. The UE autonomous resource selection procedure involves a UE sensing the resources in the resource pool and based on the sensing, selecting and reserving sidelink resources. This includes an autonomous UE determination of how many times to transmit, repeat, or retransmit (e.g., utilizing blind retransmissions) a given transmission. Those of ordinary skill in the art will recognize that in many scenarios, resource allocation mode 1 may be more suitable for UEs that are located within a network node's coverage area, while resource allocation mode 2 may be more suited for UEs that are outside a network node's coverage area. Furthermore, resource allocation mode 2 may be employed for groupcast or broadcast transmissions where a negotiation between UEs to establish an RRC connection for the sidelink is not available.

Sidelink communication may employ several physical channels and physical signals. For example, a physical sidelink control channel (PSCCH) may be used to indicate resources and other transmission parameters that a UE uses for transmission of data on a physical sidelink shared channel (PSSCH). Transmission via the PSCCH may generally include a DM-RS.

UEs may use the PSSCH to transmit data information, as well as certain control information for HARQ procedures and CSI feedback triggers, etc. PSSCH transmissions may generally include a DM-RS and may be associated with a PT-RS.

A physical sidelink feedback channel (PSFCH) carries HARQ feedback over the sidelink. A UE that is an intended recipient of a PSSCH transmission may transmit HARQ feedback via the PSFCH to the UE that performed the transmission.

A sidelink synchronization signal may include sidelink primary and sidelink secondary synchronization signals (S-PSS, S-SSS), and may be broadcast along with a physical sidelink broadcast channel (PSBCH).

Sidelink HARQ feedback uses the PSFCH. In some examples, the PSFCH may transmit either ACK or NACK using a resource dedicated to a single PSFCH-transmitting UE. In another example, the PSFCH may carry a NACK, or no PSFCH signal may transmitted. That is, in some examples, sidelink HARQ feedback via the PSFCH may be disabled. In sidelink resource allocation mode 1, a UE that obtains sidelink HARQ feedback via the PSFCH can report this feedback to a RAN via PUCCH or PUSCH.

In some examples, a UE using sidelink may transmit a channel state information reference signal (CSI-RS) for CSI measurement and reporting in the sidelink. A receiving UE may transmit the CSI report utilizing a suitable feedback or control message, for example, in a medium access control-control element (MAC-CE). In addition, a UE may measure configured sidelink resource pools for reporting a channel busy ratio (CBR). CBR reports may be periodic or event-triggered based on an overloaded channel and/or a low-loaded channel. Based on the CBR, a UE may adapt one or more transmission parameters for sidelink transmission, such as its maximum transmission power, the quantity of retransmissions to make, the modulation and coding scheme (MCS), and others.

Figure 3B:
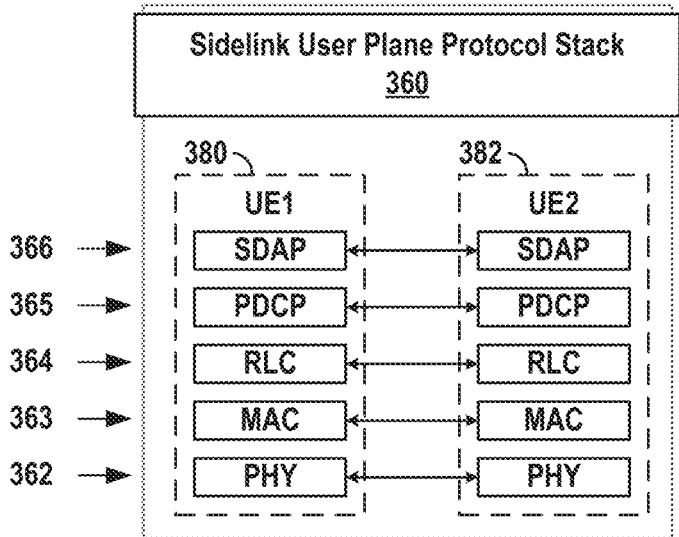
FIG. 3B is a schematic illustration of a user plane protocol stack and a control plane protocol stack for a sidelink interface between a pair of UEs in accordance with some aspects of this disclosure.
Figure 3B:
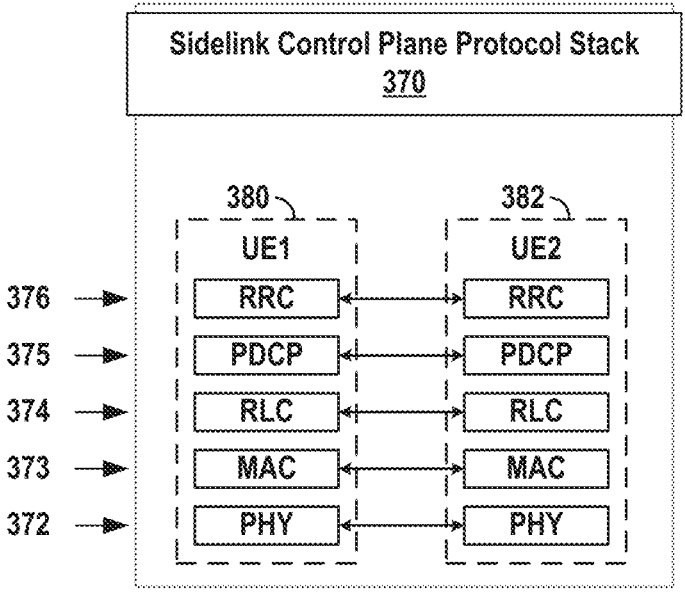

Sidelink radio bearers may be categorized into two groups: sidelink data radio bearers for user plane data and sidelink signaling radio bearers for control plane data. FIG. 3B is a schematic illustration of a sidelink user plane protocol stack 360 and a sidelink control plane protocol stack 370 for a sidelink interface between a pair of UEs (labeled UE1 106 and UE2 108) in accordance with some aspects of this disclosure. The sidelink radio protocol architecture is illustrated in FIG. 3B with sidelink user plane protocol stack 360 and sideline control plane protocol stack 370, showing their respective layers or sublayers. Radio bearers between UE 106 and UE 108 may be categorized as data radio bearers (DRB) for carrying user plane data, corresponding to sidelink user plane protocol stack 360; and signaling radio bearers (SRB) for carrying control plane data, corresponding to sidelink control plane protocol stack 370.

Both sidelink user plane protocol stack 360 and sidelink control plane protocol stack 370 include a physical (PHY) layer 362/372, a MAC layer 363/373, a RLC layer 364/374, and a PDPC layer (PDCP) 365/375. PHY layer 362/372 is the lowest layer and implements various physical layer signal processing functions. MAC layer 363/373 provides radio resource selection, packet filtering, priority handling between UL and DL transmissions for a given UE, and sidelink CSI reporting. RLC layer 364/374 provides functions such as sequence numbering, segmentation and reassembly of upper layer data packets, and duplicate packet detection. PDCP layer 365/375 provides functions including header compression for upper layer data packets to reduce radio transmission overhead, security by ciphering the data packets, and integrity protection and verification.

In sidelink user plane protocol stack 360, a service data adaptation protocol (SDAP) layer 366 provides services and functions for maintaining a desired quality of service (QoS), including mapping between a QoS flow and a sidelink data radio bearer. QoS broadly refers to the collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

In sidelink control plane protocol stack 370, a radio resource control (RRC) layer 376 includes a quantity of functional entities for transferring RRC messages between paired UEs 380, 382, for maintenance and release of an RRC connection between UEs 380, 382, and for detection of a sidelink radio link failure.

An RRC layer corresponding to a Uu interface (i.e., a radio interface between a radio access network and UE) also may include various sidelink-specific services and functions. For example, using the Uu interface, an RRC entity may configure sidelink resource allocation via system information signaling or dedicated signaling. This RRC entity may further be used for measurement configuration and reporting related to the sidelink, and for communication or reporting of UE assistance information relating to sidelink traffic patterns. That is, a UE may report sidelink traffic patterns to the RAN.

Sidelink communications may be supported by a source identifier (ID) and a destination identifier (ID). For example, a source layer-2 ID may identify the source, or sender of sidelink data. A destination layer-2 ID may identify the target, or receiver of sidelink data. Further, a PC5 link ID may be used to uniquely identify a PC5 unicast link in a UE for the lifetime of the PC5 unicast link.

Sidelink transmissions may generally fall within one of three transmission types: a unicast transmission, a groupcast transmission, or a broadcast transmission. With unicast transmissions, paired UEs can establish an RRC connection and negotiate the configuration of their mutual sidelink interface. Paired UEs can detect a radio link failure of their RRC connection, and can transmit and obtain control information and user traffic over a sidelink, including the use of sidelink HARQ feedback.

With groupcast transmissions, a transmitting UE can transmit user traffic to one or more UEs belonging to a group in sidelink. Here, a group may be identified based on respective UEs' destination layer-2 IDs. That is, UEs in a given group for a sidelink groupcast may share the same destination layer-2 ID. Broadcast transmissions are similar to groupcast, and are directed to a set of UEs that share a destination layer-2 ID.

Figure 5:
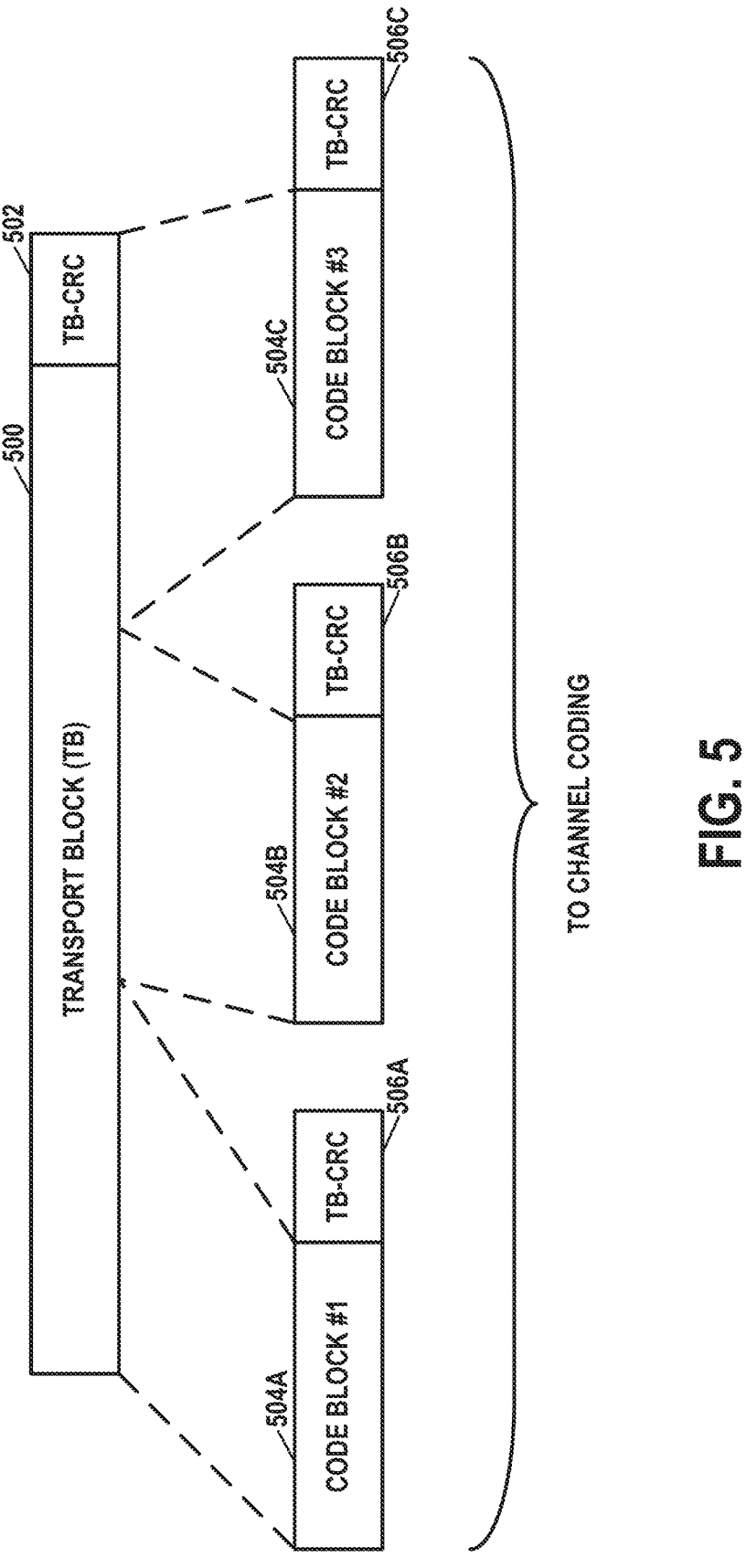
FIG. 5 is a conceptual diagram illustrating an example transport block (TB).

FIG. 5 is a conceptual diagram illustrating an example transport block (TB) 500. A TB is a packet of data that is passed between the MAC layer and Physical layer. Thus, one MAC protocol data unit (PDU), i.e., packet, is contained within one TB. TBs are passed down from the MAC layer to the Physical layer by transmitters. TBs are passed up from the Physical layer to the MAC layer by receivers. When the Physical layer at a transmitter obtains a TB from the MAC layer, the Physical layer processes the TB and maps the TB onto a physical channel, such as a Physical Downlink Shared Channel (PDSCH) or a Physical Sidelink Shared Channel (PSSCH). A CRC code is computed for the TB and appended to the TB. The size of the CRC code may depend on the size of the TB. In the example of FIG. 5, a CRC code for the TB (TB-CRC 502) is appended to TB 500.

Because a TB can be as large as 1,277,992 bits, retransmitting an entire TB when there are only a small quantity of bits of the TB that are in error may waste spectral resources. Accordingly, if a TB is larger than a threshold size, the TB may be divided into smaller units referred to as Code Blocks (CBs). In the example of FIG. 5, TB 500 and TB-CRC 502 are divided into CBs 504A-504C. In some examples, a CB has a maximum size of 8448 bits. Separate CRC codes are computed for and appended to each of the CBs. In the example of FIG. 5, CRC codes 506A-506C (TB-CRCs) are appended to CBs 504A-504C, respectively. CBs may be grouped into Code Block Groups (CBGs). For instance, each CBG may include 1, 2, 4, 6, or 8 CBs. A receiver of the TB may respond with an acknowledgement (ACK) or Negative Acknowledgement (NACK) at the CBG level, as opposed to the TB or CB level. Thus, if the transmitter obtains a NACK for a CBG, the transmitter only needs to retransmit the CBG and not the entire TB.

Figure 6:
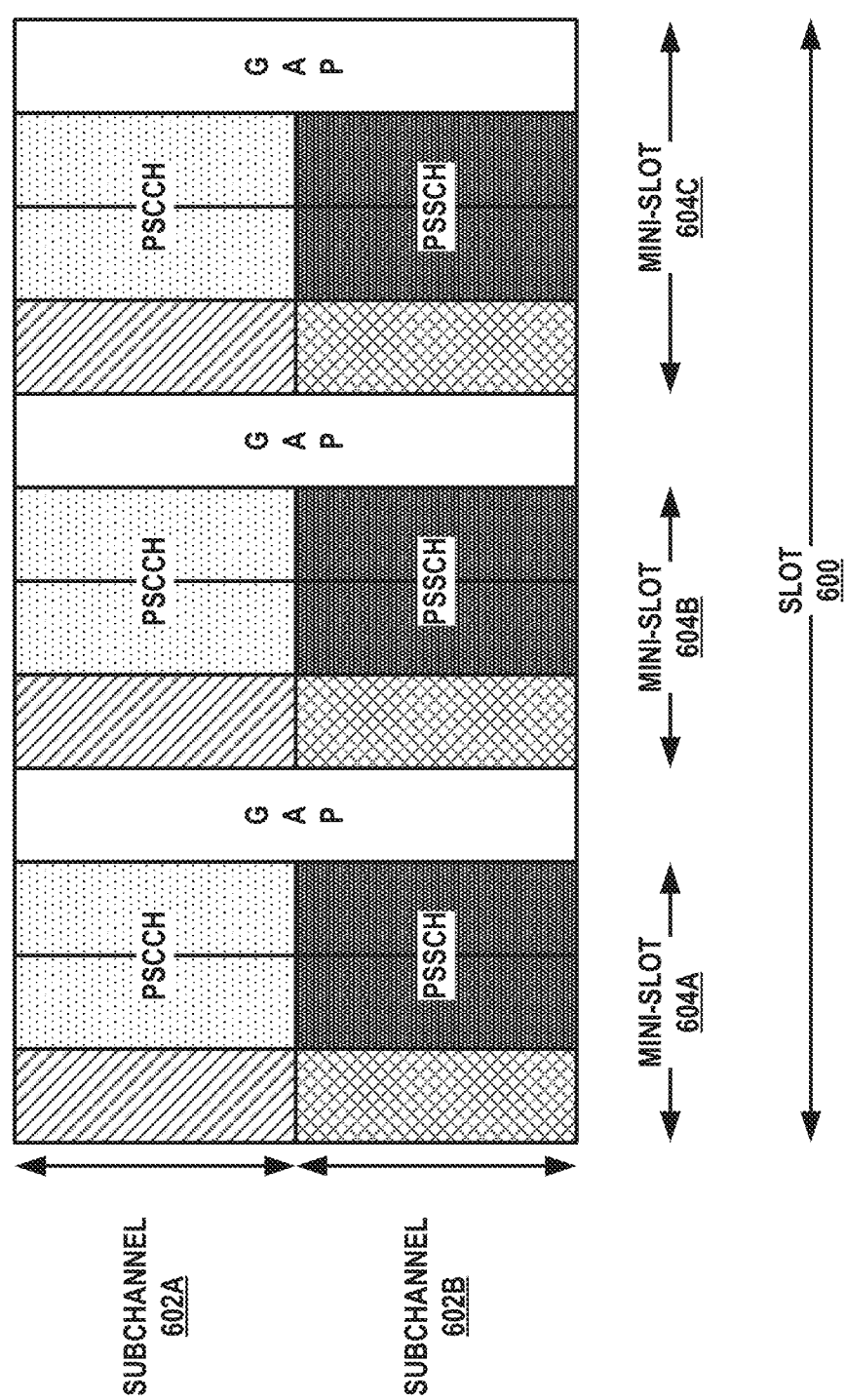
FIG. 6 is a conceptual diagram illustrating example mini-slots in sidelink communication.

FIG. 6 is a conceptual diagram illustrating example mini-slots in sidelink communication. In Release 18 of the 5G NR specification, a slot may be subdivided into two or more mini-slots having shorter durations than the slot. The use of mini-slots may reduce scheduling delays and may reduce turn-around time for sidelink communication. This reduction in scheduling delays and turn-around times may be especially important for delay stringent applications and services, including Industrial Internet of Things (IIOT) applications, Ultra Reliable Low Latency Communications (URLLC) applications, and Extended Reality (XR) applications.

In the example of FIG. 6, a slot 600 has two subchannels 602A, 602B (collectively, "subchannels 602") and is divided into three mini-slots 604A, 604B, 604C (collectively, "mini-slots 604"). Each of subchannels 602 is a different set of two or more resource blocks. (A resource block may comprise 12 REs). Each rectangle in FIG. 6 represents one or more concurrent RBs. The term "resource pool" may be used to refer to a set of subchannels. The terms "sub-slot" and "mini-slot" may be used interchangeably.

In the example of FIG. 6, there is a temporal gap of one OFDM symbol after each of mini-slots 604. Each of mini-slots 604 can carry one or more (e.g., two, four, etc.) OFDM symbols. Each of the mini-slots has REs for PSCCH data and PSSCH data. In the example of FIG. 6, dark speckling corresponds to REs for PSSCH data and light speckling corresponds to REs for PSCCH data. REs marked with diagonal-hatching and crosshatching may be, e.g., for automatic gain control (AGC).

Each of mini-slots 604 is self-schedulable and decodable. Furthermore, a UE can select and reserve one or more of mini-slots within a slot. For instance, a UE may select and reserve mini-slots 604A and 604B. A mini-slot being self-schedulable means that the data in the PSSCH of the mini-slot is scheduled by a scheduling grant (sidelink control information, SCI) in the PSCCH of the mini-slot. A mini-slot being self-decodable means that the CODEC does not need information from any other mini-slots to decode the data in that mini-slot.

Higher quantities of mini-slots within a slot may enhance scheduling latency and may be suitable for small packets, such as 32-bit packets used in IIOT applications. However, as the quantity of mini-slots per slot increases, more symbols should be allocated to the gaps between the mini-slots. In some use cases, such as use cases in which a large quantity of UEs is supported, the overhead associated with the gaps may degrade latency reduction gains.

Figure 7:
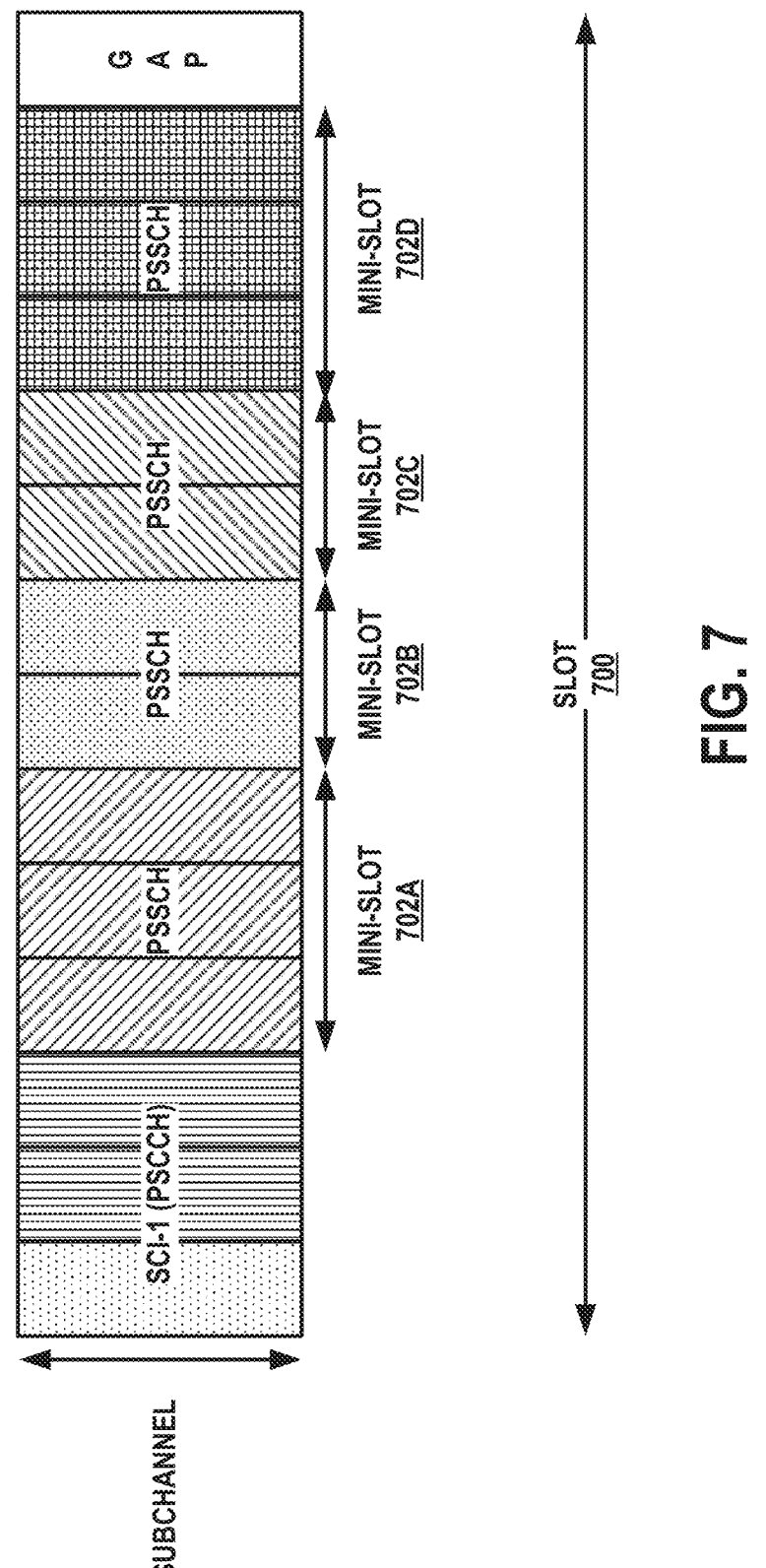
FIG. 7 is a conceptual diagram illustrating an example alternative design for mini-slots.

FIG. 7 is a conceptual diagram illustrating an example alternative design for mini-slots. It is noted that the gap symbols are primarily used for Tx/Rx switching. Because Tx/Rx switching is only possible at a slot boundary in 3GPP specifications for 5G NR (Rel. 16), gaps are only used at the end of a slot. Accordingly, slots may be divided into mini-slots according to a specific pattern that specifies the quantity of mini-slots per slot and the length (i.e., quantity of OFDM symbols) of each of the mini-slots. Sidelink Control Information (SCI) SCI1/PSCCH data may be included in REs at the beginning of each slot. The SCI included at the beginning of a slot may indicate a transmission or reservation of a quantity of mini-slots in the slot or future slots. SCI-1 is stage 1 sidelink control information. SCI-1 may be carried on a physical sidelink control channel (PSCCH). On the other hand, SCI-2 (i.e., stage 2 sidelink control information) may be carried or multiplexed with data on a physical sidelink shared channel (PSSCH).

In the example of FIG. 7, a slot 700 includes REs for SCI-1 and includes mini-slots 702A, 702B, 702C, and 702D (collectively, "mini-slots 702"), followed by a gap. Thus, FIG. 7 shows an example of a pattern in which there are not gaps between mini-slots. In some examples, the first RE of slot 700 is an AGC symbol. In other examples, it may not be necessary to include AGC symbols in slot 700 because the receiver can set the AGC based on the first symbol of slot 700 and use the same setting for the reception of any of the PSSCH mini-slots.

There are several cases in which a UE may reserve multiple mini-slots for the UE's sidelink transmissions. These transmission types may include the transmission types referred to herein as Transmission Type A, Transmission Type B, and Transmission Type C.

Transmission Type A refers to cases in which the reserved mini-slots are bundled and form a super-slot or super-mini-slot. In other words, mini-slots of one or more slots combined are used for transmission of a single transport block (TB). A super-slot comprises multiple slots. A super-mini-slot comprises multiple mini-slots across at least one slot. Thus, two or more slots may include mini-slots of a single super-mini-slot. In the context of FIG. 7, the symbols in each of mini-slots 702 may contain data of a single TB. In other words, multiple mini-slots of one or more slots are used for transmission of a TB containing data to be transmitted.

Transmission Type B refers to cases in which one TB, with the same redundancy version (RV) index or different RV indices, is repeated on the reserved mini-slots. In other words, a TB containing data to be transmitted is repeated with a same or different redundancy version (RV) in different ones of one or more mini-slots.

The bits of the TB may be stored in a conceptually circular buffer. An RV index of an RV version of the TB indicates a starting point within the circular buffer at which to start the RV version of the TB. For example, if the TB is 24 bits long (i.e., the bits of the TB have bit indexes 0 . . . 23), an RV version of the TB having RV index 0 may be bits 0 . . . 23, an RV version of the TB having RV index 3 may be bits 3 . . . 23 onto which bits 0 . . . 2 are concatenated, an RV version of the TB having RB index 6 may be bits 6 . . . 23 onto which bits 0 . . . 5 are concatenated, and so on.

Thus, in examples of Transmission Type B where the same RV index is repeated in the reserved mini-slots, the same RV of the TB may be transmitted in mini-slots 702A, 702B, 702C, and 704D. In examples of Transmission Type B where the TB is repeated with different RV indexes in the reserved mini-slots, a first RV of the TB may be transmitted in mini-slot 702A, a second RV of the TB may be transmitted in mini-slot 702B, a third RV of the TB may be transmitted in mini-slot 702C, and a fourth RV of the TB may be transmitted in mini-slot 702D.

Transmission Type C has two versions. In a first version of Transmission Type C, a plurality of mini-slots within a slot are used to transmit one TB, where each mini-slot uses an RV or all resources form one TB. For instance, in the example of FIG. 7, a first TB may be transmitted in mini-slots 702A and 702B, a second TB may be transmitted in mini-slot 702C, and a third TB may be transmitted in mini-slot 702D. In this case, the TB size may be determined based on the number of allocated resource elements (REs). In some examples, an RB consists of 12 REs.

A second version of Transmission Type C is a special case of the first version of Transmission Type C in which every mini-slot carries a different TB. For instance, in the example of FIG. 7, a first TB may be transmitted in mini-slot 702A, a second TB may be transmitted in mini-slot 702B, a third TB may be transmitted in mini-slot 702C, and a fourth TB may be transmitted in mini-slot 702D. Thus, in either version of Transmission Type C, a slot includes a first set of one or more of the mini-slots and a second set of one or more of the mini-slots, the data includes first data and second data, and a first TB containing the first data is in the first set of mini-slots and a second TB containing the second data is in the second set of mini-slots.

In some aspects, this disclosure describes techniques that may reduce retransmission power and save resources with respect to Transmission Types B and C (i.e., Transmission Types in which one TB is transmitted with the same RV or different RVs across the mini-slots).

Figure 8:
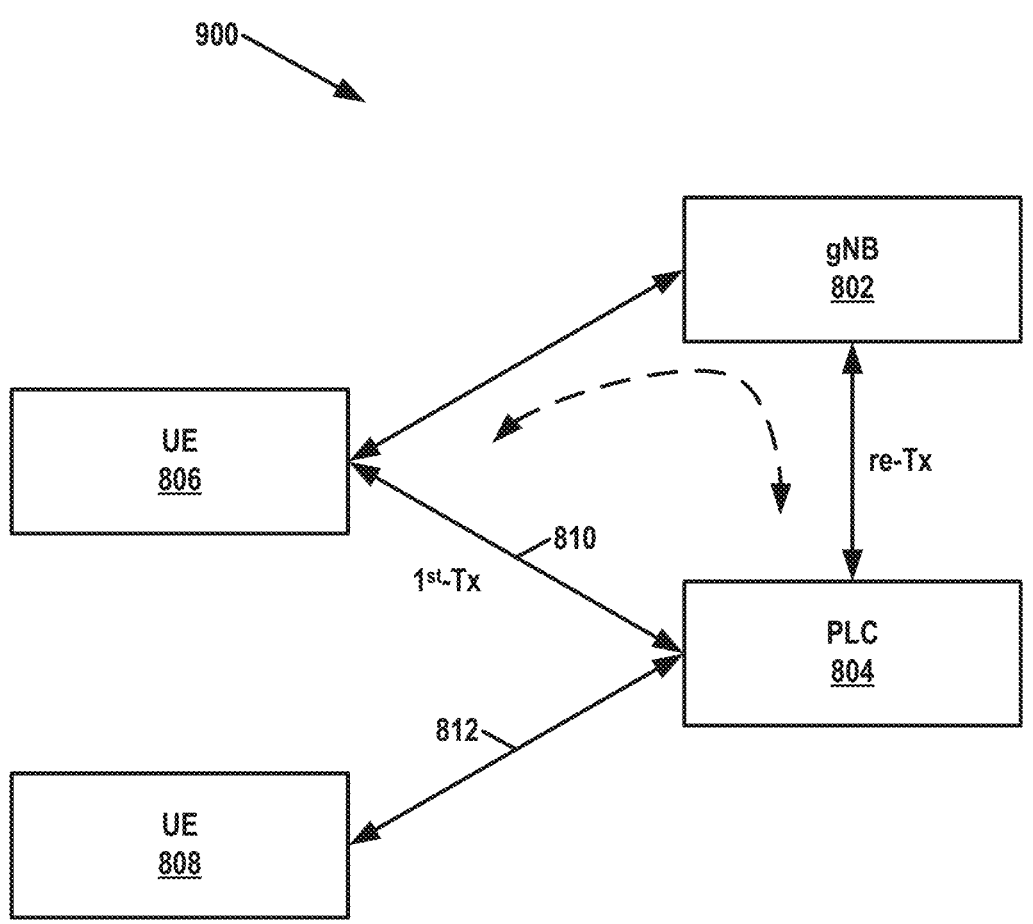
FIG. 8 is a conceptual diagram illustrating an example network system according to techniques of this disclosure.

FIG. 8 is a conceptual diagram illustrating an example network system 800 according to techniques of this disclosure. Network system 800 includes a gNB 802, a programmable logic controller (PLC) 804, a UE 806, and a UE 808. In other examples, PLC 804 may be a sidelink controller or a primary UE. PLC 804 may use sidelink channel 810 and sidelink channel 812 to communicate with UE 806 and UE 808, respectively. A primary UE may be a device that schedules resources for a sidelink channel.

In some examples, gNB 802 or PLC 804 may indicate to UE 806 to use a particular Transmission Type. For instance, gNB 802 or PLC 804 may instruct UE 806 to use one of Transmission Type A, Transmission Type B, or Transmission Type C. In examples where gNB 802 instructs UE 806 which Transmission Type to use, gNB 802 may instruct UE 806 in the form of a Radio Resource Control (RRC)/Media Access Control (MAC)-Control Element (CE) data or Downlink Control Information (DCI).

Resource allocation for wireless resources in a sidelink resource pool may employ one of two modes, referred to herein as mode 1 and mode 2. In mode 1, which may be referred to as scheduled resource allocation, the sidelink resource allocation is provided by the network. In mode 2, which may be referred to as UE autonomous resource allocation, a UE decides the SL transmission resources and timing in the resource pool. Resource allocation mode 1 may generally be managed by a scheduling entity or gNB. In some examples, a UE 806 may transmit a sidelink buffer status report (BSR) to a gNB 802 to support scheduling of sidelink resources via resource allocation mode 1. A sidelink BSR indicates that a UE 806 has data buffered or ready for transmission over sidelink to a destination UE-Rx. in some examples, gNB 802 may use one of several different types of sidelink grants. With a type-1 sidelink configured grant, which may be referred to as a static grant, a gNB may employ higher-layer (e.g., RRC) signaling to provide resources for a persistent sidelink grant for sidelink communication. With a type-2 sidelink configured grant, which may be referred to as a semi-static grant, a gNB may transmit a suitable DCI on the PDCCH to either activate or deactivate the resources for a sidelink grant.

In some examples of this disclosure, gNB 802 may use Mode 1 resource allocation with either dynamic or configured grant of resources. In some such examples, gNB 802 may indicate the Transmission Type that UE 806 is to use within the same DCI that gNB 802 uses to allocate resources to UE 806.

In some examples, instead of gNB 802 or PLC 804 instructing UE 806 which Transmission Type to use, UE 806 may determine which Transmission Type to use based on reliability or rate requirements. For example, UE 806 may be configured with data (e.g., a table) that maps specific reliability and/or rate requirements to specific Transmission Types.

Some modern wireless networks, such as a 5G NR network, may provide radio resources over a very wide frequency range. However, any given UE accessing a cell may have bandwidth capabilities that do not span this entire range. Accordingly, a RAN may configure a part or a portion of a carrier for that UE, called a bandwidth part (BWP), which has a bandwidth less than or equal to that UE's capabilities. A RAN may configure a UE with several BWPs (in some examples, up to four BWPs); although typically only a single BWP at a time is an active BWP. In this disclosure, a BWP refers to a set of wireless resources (e.g., a contiguous set of Physical Resource Blocks (PRBs)) selected as a subset of the wireless resources on a given carrier. In some examples, a BWP may be selected from among a contiguous set of resource blocks that share a common numerology (e.g., subcarrier spacing) on a given carrier. The RAN generally does not expect a UE to communicate outside an active BWP.

gNB 802 may divide a BWP into two or more resource pools. An initial resource pool configuration specifies how the complete bandwidth is divided into resource pools. During resource allocation, gNB 802 may allocate resources from one or more resource pools for use for sidelink transmissions. The resources available for allocation in the resource pool may include subchannels (each of which may include one or more resource blocks).

In some examples of this disclosure, the initial resource pool configuration may also specify Transmission Types to use for transmitting data in different resource pools. For example, the initial resource pool configuration may specify that Transmission Types B and C may be used in resources allocated from a first resource pool and may specify that Transmission Type A may be used in resources allocated from a second resource pool.

Additionally, the initial resource pool configuration may specify repetition factors for a resource pool. The repetition factor for a resource pool may specify how many repetitions of a TB (with the same or different RVs indexes) are to be transmitted. gNB 802 may determine the repetition factor based on one or more factors, such as priority levels of the resource pools or Quality of Service (QoS) levels of the resource pools. For example, if a first flow associated with a resource pool has a higher priority than a second flow, gNB 802 may assign a higher repetition factor (and consequently a low block error rate) to the resource pool. gNB 802 may determine that the first flow has higher priority than the second flow based on channel status reports collected from UEs, based on the priority of data, based on required achieved block error rate (BLER)/reliability, and/or other factors.

A packet may include one or more TBs. Packet delays may occur due to resources being used for retransmitting TBs in response to NACKs. A Packet Delay Budget (PDB) defines an upper limit on the amount of time that a packet may be delayed between the UE and a user plane function (UPF). For instance, XR applications may prioritize timely delivery of a packet over accuracy of data in the packet. As accumulated delays approach the PDB, measures may be taken to reduce the delays, potentially at the expense of reliability of data in the packet. In some examples, the repetition factor indicated by the initial resource pool configuration for a resource pool may be chosen based on the PDB for an application that will use the resource pool.

In some examples, UE 806 may switch to Transmission Type C based on approaching a PDB. Accordingly, in such examples, UE 806 may change from Transmission Type B (which may involve a higher repetition factor because of transmitting multiple RVs of a TB) to Transmission Type C. For example, using different TBs to finish transmitting the packet might be appropriate, or repetition to achieve reliability of TBs of the packet. Thus, there could be tradeoff (repeat with some factor but still send more than a TB per slot).

In some examples, the transmitting UE (e.g., UE 806) can determine the quantity of repetitions (i.e., a repetition factor) based on Logical Channel Group (LCG) priority and/or Quality of Service (QoS). Multiple logical channels of different priorities (e.g., QoS levels) can be multiplexed into the same TB using MAC multiplexing functionality. An LCG is a group of logical channels. The transmitting UE may determine how to prioritize transmission of such multiplexed TBs. In other words, the transmitting UE may determine priorities of logical channels. In accordance with a technique of this disclosure, the transmitting UE may determine the repetition factor for TBs sent in LCG based on the prioritization of the LCG. For instance, the transmitting UE may store data (e.g., a table) that maps specific repetition factors to prioritizations of LCGs.

The UE may then select the repetition factor based on feedback from the receiving UE (Rx-UE) and approaching the PDB deadline to maintain the highest priority for the transmitted signals. In other words, the quantity of repetitions may be a function of feedback from Rx-UE, QoS, and/or the remaining PDB. For example, to reduce error or refrain errors (e.g., to lower the BLER or possibility of error), the UE may select a repetition factor associated with a greater quantity of repetitions when a QoS or PDB deadline is approaching. The determined quantity of repetitions may apply to new TB transmissions and also for retransmission.

In this way, the Tx-UE may repeat the transmission of data a first quantity of times, wherein the first quantity of times is based on a first repetition factor. The first repetition factor is based on LCG priority or QoS of the data. The Tx-UE may obtain feedback from the second wireless device. The Tx-UE may repeat the transmission of the data a second quantity of times. The second quantity of times may be based on a second repetition factor, wherein the second repetition factor is based on the feedback from the second wireless device and a PDB deadline of a packet containing the data.

In some examples, the transmitting UE may use the quantity of NACKs within a configurable interval of time as an indicator of need to lower or increase the repetition factor (at high signal-to-noise ratios (SINR), low NACK, repetition can be as small as 0 or 1). Thus, in such examples, the Tx-UE may repeat the transmission of the data in the mini-slots based on a quantity of NACKs in a set of one or more NACKs obtained within a time interval. The time interval may be defined at Layer 1 (e.g., DCI or SCI), Layer 2 (e.g., MAC-CE), or Layer 3 level (e.g., RRC). For instance, the transmitting UE (Tx-UE) may send sidelink data to Rx-UE during a time period from t-x to t-y, where x>y. Tx-UE may resume sending additional sidelink data to Rx-UE at time t. Prior to sending the additional sidelink data Tx-UE may determine the repetition factor based on the quantity of NACKs obtained from Rx-UE within the period from t-x to t-y. For instance, the transmitting UE may store a look-up table for determining the repetition factor based on a detected quantity of NACKs. Such a look-up table may be defined in specifications, or may be controlled or configured by a gNB or Rx-UE. That is, in some examples, a gNB, a PLC, an Rx-UE, or some combination of these may use any suitable L1/L2/L3 signaling to configure a Tx-UE for a given relationship between the quantity of received NACKs and number of repetitions.

A physical layer of the Rx-UE may apply a LDPC decoder to data obtained from Tx-UE. The LDPC decoder uses parity bits included in the data to perform linear error correction. The LDPC decoder may maintain statistics regarding the quality of obtained data before and after applying linear error correction. For example, the LDPC decoder may maintain a table defining a relationship between Log Likelihood Ratio (LLR) of the data and a quantity of repetitions of TBs. In some examples, the LDPC decoder may maintain a table defining a relationship between the quantity of unsatisfied parity bits and the quantity of repetitions of the TBs. In some examples, the statistics may include a computed or estimated signal-to-interference and noise ratio (SINR).

The MAC layer of the Rx-UE may apply a CRC decoder to TBs, or CBGs, passed up to the MAC layer from the physical layer. For purposes of this discussion, it is assumed that the TBs are not divided into CBs or CBGs. The CRC decoder evaluates the CRC code of the TB to detect changes in the TB. A TB is said to pass a CRC if the CRC decoder determines that there are no changes in the TB. If the TB passes the CRC, the MAC layer may pass the content of the TB (i.e., a PDU) up to the next-higher level of the protocol stack.

Multiple repetitions of a TB may be required for the TB to pass the CRC. For instance, the CRC decoder may obtain multiple repetitions of the TB and compare corresponding bits within the repetitions of the TB. If the CRC decoder determines, based on the CRC code of the TB that there is an error, the CRC decoder does not automatically send a NACK to the Tx-UE for the TB. Rather, the CRC decoder may obtain and compare multiple repetitions of the TB. The CRC decoder may use chase combining or incremental redundancy processes to use multiple repetitions to determine if there is an error. If the CRC decoder determines that there is still an error, the CRC decoder may generate a NACK for the TB.

The Rx-UE may determine, based on one of the above-described statistics or a combination of two or more of the above-described statistics, the quantity of repetitions still required for the TB to pass a CRC. For example, the Rx-UE may store data (e.g., a table) that maps potential values/ranges of the statistics to specific quantities of repetitions. In this example, the Rx-UE may use this data to determine the quantity of repetitions.

Figure 9:
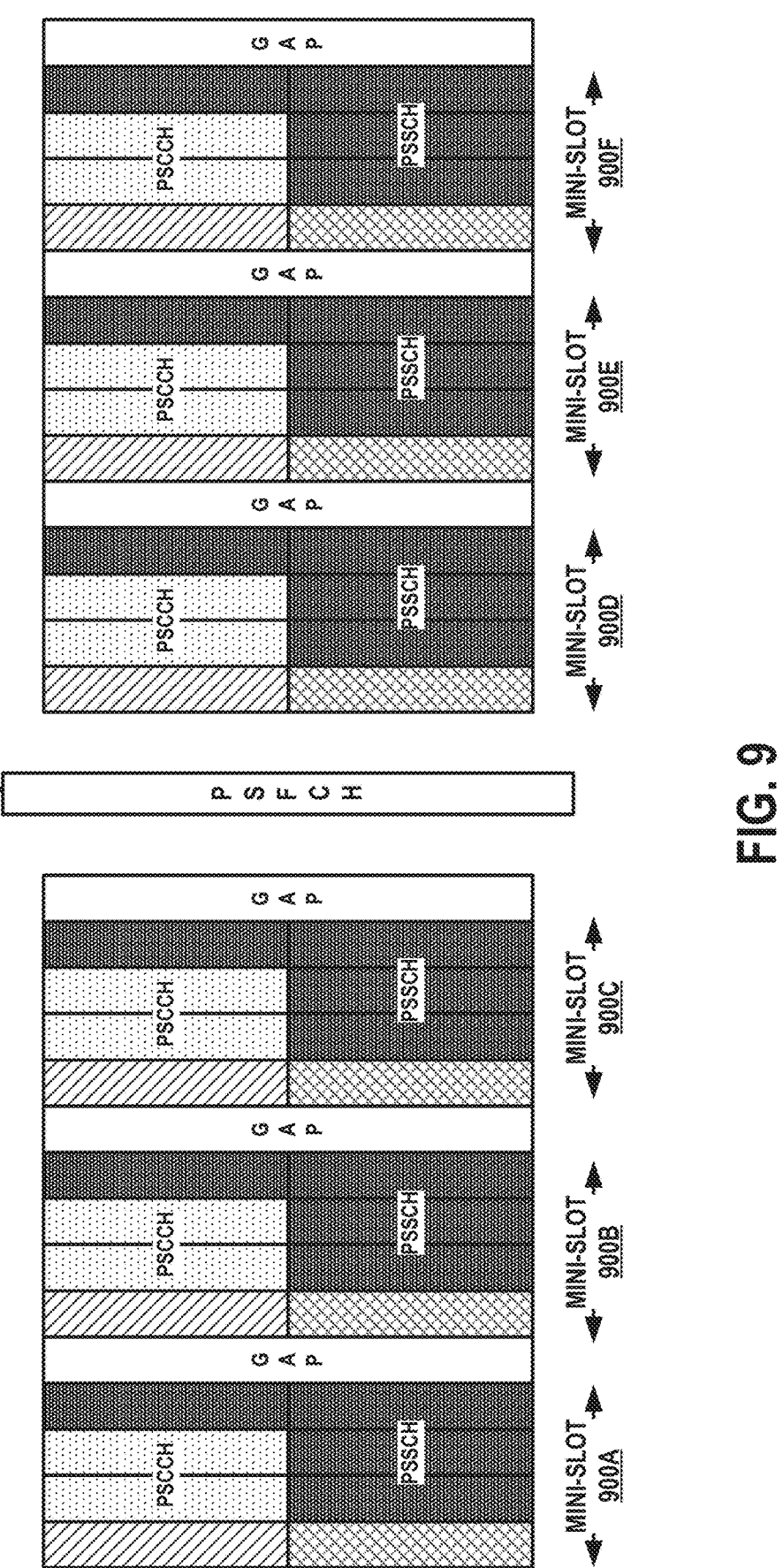
FIG. 9 is a conceptual diagram illustrating an example of mini-slots and a physical sidelink feedback channel according to techniques of this disclosure.

FIG. 9 is a conceptual diagram illustrating an example of mini-slots 900A-900F (collectively, "mini-slots 900") and a slot 902 allocated to a physical sidelink feedback channel (PSFCH) according to techniques of this disclosure. In the example of FIG. 9, mini-slots 900A-900C belong to a first slot and mini-slots 900D-900F belong to a second slot. Slot 902 occurs after the first slot and before the second slot. A Rx-UE may use the PSFCH to provide feedback information directly to a Tx-UE.

In accordance with techniques of this disclosure, the Rx-UE may send repetition request data to the Tx-UE. The repetition request data may indicate the quantity of repetitions required for the TB to pass the CRC. In some examples, the Rx-UE sends the repetition request data to the Tx-UE via a PSFCH. The Tx-UE for the sidelink may allocate slots for PSFCH transmissions according to a PSFCH periodicity. The PSFCH periodicity indicates how many slots allocated for PSSCH transmissions occur between a slot allocated for PSFCH transmission (i.e., a PSFCH slot). The PSFCH periodicity may be set, e.g., to one of 0, 1, 2, or 4. If the PSFCH periodicity is set to 0, PSFCH transmissions are disabled. The quantity of physical resource blocks (PRBs) of the PSSCH associated with a PSFCH slot may be equal to the PSFCH periodicity multiplied by a quantity of subchannels and an alpha value. The alpha value may be a value of a cyclic shift.

The quantity of physical resource blocks (PRBs) in a PSFCH slot associated with each subchannel may be equal to the quantity of PRBs of the PSSCH associated with the PSFCH divided by a multiplication product of the quantity of sub-channels and the quantity of PSSCH slots associated with the PSFCH slot. For instance, in an example where the quantity of PRBs of the PSSCH associated with the PSFCH is 80, PSFCH periodicity is 4, the quantity of subchannels is 10, the quantity of PRBs in the PSFCH slot associated with each subchannel may be equal to 2. In some examples, there may be two PRBs in a concurrent set of PRBs allocated for the PSFCH for each sub-channel.

Each PRB of the PSSCH is mapped to one or more PRBs in a PSFCH slot. The mapping between a PRB of the PSSCH and a PRB in a PSFCH slot may be determined based on:

the sub-channel of the PRB of the PSSCH or the quantity of subchannels in the PSSCH.

the slot containing the PRB of the PSSCH a source ID of a packet transmitted in the PRB, and a destination ID of the packet transmitted in the PRB.

In some examples, the Tx-UE stores a table that maps sub-channels, slots, source IDs, and/or destination IDs to specific PRBs in a PSFCH slot. In some examples, the table maps combinations of two or more of sub-channels, slots, source IDs, and destination IDs to specific PRBs in a PSFCH slot. The table may be configured in various ways. For example, one or more devices, such as gNBs or scheduling entities, may send data of the table to the Tx-UE.

The Rx-UE may send the repetition request data to the Tx-UE in one of a variety of ways. For example, the Rx-UE may explicitly indicate the repetition request data in a PRB of the PSFCH. In some examples, the Rx-UE may send a predefined sequence to the Tx-UE. The Rx-UE may perform a cyclic shift (CS) on the predefined sequence. In some examples, the Rx-UE may transmit a first cyclically shifted sequence to indicate ACK/NACK and a second cyclically shifted sequence to indicate the repetition request data. In other examples, the Rx-UE may use a cyclically shifted sequence that jointly indicates ACK/NACK and the repetition request data. Thus, different cyclic shifts may correspond to different combinations of ACK/NACK and repetition request data. In some such examples, the Rx-UE may use the following table to indicate ACK/NACK and repetition request data.

TABLE 1

| Bit value | Representation |
| --- | --- |
| 0 0 (CS = 0) | NACK + repetition factor 1 (or delta repetition factor or additional repetition factor) |
| 0 1 (CS = 3) | NACK + repetition factor 2 (or delta repetition factor or additional repetition factor) |
| 1 0 (CS = 6) | ACK + repetition factor x |
| 1 1 (CS = 9) | ACK + repetition factor y |

In Table 1, the first bit value indicates ACK or NACK and the second bit value indicates a repetition factor. However, the Rx-UE does not explicitly send these two bits. A delta repetition factor is a positive or negative difference from a previous repetition factor. In some examples, one or more of the cyclic shifts may indicate two or more repetition factors (e.g., a repetition factor and one or more additional repetition factors). In some examples, the repetition factors may correspond to different types of data the Tx-UE is transmitting. The mappings in Table 1 may change over time. For instance, the values of repetition factor 1, repetition factor 2, repetition factor x, and repetition factor y may change over time. For example, the Tx-UE and Rx-UE may change the values of repetition factor 1, repetition factor 2, repetition factor x, and repetition factor y based on network conditions. In some examples, a scheduling entity may command the Tx-UE and/or Rx-UE to change the values of repetition factor 1, repetition factor 2, repetition factor x, and repetition factor y may change. Repetition factors 1, 2, x, and y may each be different from one another or one or more of repetition factors 1 and x and/or 2 and y may be the same.

In this way, the Rx-UE may output, for transmission to the Tx-UE, feedback data via a physical sidelink feedback channel, wherein a cyclic shift of the feedback data indicates an ACK or NACK for the data and also the repetition request data. Similarly, the Tx-UE may obtain feedback data from the Rx-UE via a physical sidelink feedback channel. The feedback data may have a cyclic shift that identifies which of an ACK or NACK the feedback sequence corresponds to. The Tx-UE may determine a repetition factor based on the cyclic shift of the feedback sequence. The Tx-UE may repeat transmission of data in mini-slots a specific quantity of times. The specific quantity of times may be based on the cyclic shift of the feedback data (which may be based on the determined repetition factor).

The Rx-UE may determine the repetition factors for future TBs based on anticipated amounts of interference. The Rx-UE may determine the anticipated amount of interference based on LLR statistics and/or signal-to-noise ratios. For instance, the Rx-UE may maintain a table that maps ranges of LLR values and/or SINR values to different repetition factors.

In some examples, the Rx-UE may select a cyclic shift based on a first mini-slot index, a last mini-slot index, a mini-slot index between the first mini-slot index and the last mini-slot index, or a combination thereof. For example, if the index of the first mini-slot used for transmitting data has a first value (or is in a first range), the Rx-UE may select a first cyclic shift, if the index of the first mini-slot used for transmitting the data has a second value (or is in a second range), the Rx-UE may select a second cyclic shift different from the first cyclic shift, and so on. Similarly, if the index of the last mini-slot used for transmitting data has a first value (or is in a first range), the Rx-UE may select a first cyclic shift, if the index of the last mini-slot used for transmitting the data has a second value (or is in a second range), the Rx-UE may select a second cyclic shift different from the first cyclic shift, and so on. Similar examples may be provided that use an index of another mini-slot to select the cyclic shift.

In another example of providing repetition request data to the Tx-UE, ACKs and NACKs may be signaled in different RBs of the PSFCH from repetition request data. In some such examples, the Rx-UE may use an RB offset to separate the RBs of the PSFCH that indicate ACKs/NACKs and the RBs of the PSFCH that indicate repetition request data. Thus, in this example, the Rx-UE may output feedback data for transmission to the Tx-UE via a physical sidelink feedback channel. The feedback data may include a set of RBs that includes at least a first RB and a second RB. The first RB indicates which of an ACK or NACK the feedback data correspond to. The second RB may include the repetition request data indicating a repetition factor. In this example, the Rx-UE may obtain data in second mini-slots a quantity of times, wherein the quantity of times is based on the repetition factor. Similarly, the Tx-UE may obtain feedback data from the Rx-UE via a physical sidelink feedback channel, the feedback data including a first RB and a second RB. The Tx-UE may determine, based on the first RB, which of an ACK or NACK the feedback data correspond to. The Tx-UE may output, for transmission to the Rx-UE, repetitions of data in mini-slots a quantity of times. The quantity of times is based on a repetition factor. The repetition factor may be based on the second RB.

The Rx-UE may determine the RB offset between the first RB and the second RB based on a first mini-slot index, a last mini-slot index, a mini-slot index between the first mini-slot index and the last mini-slot index, or a combination thereof. In some examples, the Rx-UE may store a look-up table that contains a plurality of entries. Each of the entries in the look-up table may map a first mini-slot index, a last mini-slot index, a mini-slot index between the first mini-slot index and the last mini-slot index, or a combination thereof to a specific RB offset. In this example, the Rx-UE may use the look-up table to determine the RB offset to use. For instance, if data received by the Rx-UE starts in a mini-slot having a specific mini-slot index, the Rx-UE may identify an entry in the look-up table associated with the specific mini-slot index. The Rx-UE may then use the RB offset indicated by the identified entry.

The PSFCH may be organized according to one of a plurality of formats. In the PSFCH 0, resources are fixed indexed according to ascending order of the PRB index, and then according to an ascending order of the cyclic shift pair index from cyclic shift pairs. In some formats of the PSFCH other than PSFCH format 0, the repetition request data that the Rx-UE sends to the Tx-UE is multiplexed with data ACK/NACK data according to HARQ-ACK and/or other data. The Tx-UE may apply a polar encoder or a sequence-based encoder to the multiplexed data to determine the repetition request data. In one example, the Rx-UE transmits the ACK/NACK bits using PSFCH format 0. In this example, because the repetition request data may need more bits, the Rx-UE may transmit the repetition request data using another format. In some examples, the Rx-UE may transmit repetition request data indicating the quantity of repetitions required for a current TB to pass the CRC and may also transmit repetition request data indicating the quantity of repetitions requested for future TBs.

In some examples, the Rx-UE may indicate which RV indices the Tx-UE is to use during the remaining retransmissions of a current TB if a NACK is present. In other words, the Rx-UE may send data to the Tx-UE indicating a set of one or more RV indices for a TB. If the Rx-UE did not successfully decode the TB and therefore sends a NACK to the Tx-UE, the Tx-UE may transmit versions of the TB having RV indices in the set of RV indices. In some examples, the Rx-UE may indicate the set of RV indices by indicating which mini-slot indices to use for retransmission of the TB. A mini-slot index is an index that identifies a mini-slot. The Tx-UE may then determine the RV indices based on the mini-slot indices. For instance, the Rx-UE may indicate mini-slot indices 2, 4, and 6, which the Tx-UE may determine correspond to RV indices 2, 4, and 6. In this way, the Rx-UE may output a mini-slot indication for transmission to the second wireless device, the mini-slot indication indicating a mini-slot index for retransmission. The Rx-UE may obtain, from the Tx-UE, a version of the data having a RV index based on the mini-slot indication. In some examples, the Tx-UE may request the RV indices from the Rx-UE. The requested RV indices may be different from RV indices used in previous transmissions during previous mini-slots.

In this way, the Tx-UE may obtain a mini-slot indication from the Rx-UE, the mini-slot indication indicating a mini-slot index for retransmission. The Tx-UE may determine a RV index based on the mini-slot indication. The Tx-UE may output, for transmission to the second wireless device, a version of the data having the RV index.

The Tx-UE may implement a LDPC decoder that applies error correction at a Physical layer. The decoder maintains input LLR statistics and output LLR statistics. The input LLR statistics provide information about error rates before error correction. The output LLR statistics provide information about error rates after error correction. In some examples, the Rx-UE may send feedback to the Tx-UE indicating a soft RV start index and a soft RV end index. A CB is stored in a circular buffer. Different repetitions of a CB may have different repetition versions. Hence, different repetitions of a CB may include different parts of the CB. A soft RV start index indicates the start of a repetition in the circular buffer. A soft RV end index indicates the end of the repetition in the circular buffer. The Rx-UE may determine the soft RV start index and the soft RV end index based on input LLRs and output LLRs of the decoder and based on LDPC statistics.

In some examples, rather than the Rx-UE providing repetition request data to the Tx-UE, the Tx-UE may apply channel and interference prediction techniques based on channel statistics and interference statistics. The Tx-UE may predict the SINR using the channel and interference prediction techniques. Based on predicted SINR, the UE may predict an MCS or predict the required number of resources to achieve a certain block error rate requirements. Then, based on current allocation size and the predicted required resources, the UE determines how many repetitions are needed. Thus, the predicted SINR may help the Tx-UE set the quantity of remaining repetitions needed for the TB to pass the CRC. In some examples, the Tx-UE may use the determined quantity of repetitions when transmitting new TBs.

In some examples, the Tx-UE may take other factors into account, such as priority, QoS, and remaining packet delay budget (PDB) into account when determining the quantity of repetitions. In other words, the Tx-UE may determine a repetition factor based on a priority, QoS, or remaining PDB corresponding to the data. The Tx-UE may output, for transmission, repetitions of the data, wherein a quantity of the repetitions is based on the priority, QoS, or remaining PDB. In some examples, the Tx-UE may store a look-up table. Individual entries in the look-up table map individual factors (e.g., priority, QoS, remaining PDB) to specific quantities of repetitions. The Tx-UE may identify an entry in the look-up table associated with one or more of the factors. The Tx-UE may determine that the quantity of repetitions is the quantity of repetitions specified by the identified entry.

Figure 10:
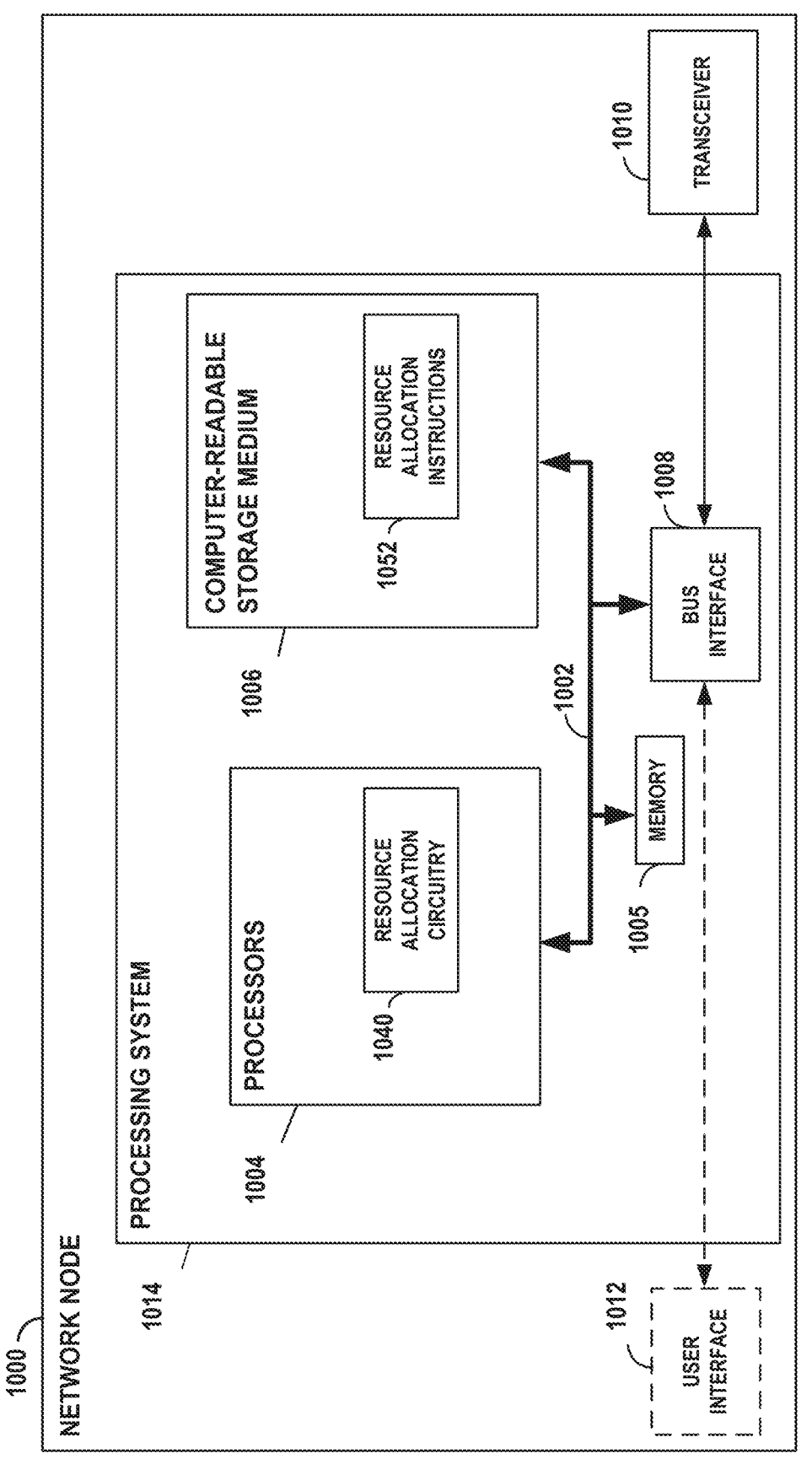
FIG. 10 is a block diagram conceptually illustrating an example of a hardware implementation for a network node according to some aspects of this disclosure.

FIG. 10 is a block diagram illustrating an example of a hardware implementation for a network node 1000 employing a processing system 1014. For example, network node 1000 may be a user equipment (UE) as illustrated in any one or more of FIG. 1 or 2. In another example, network node 1000 may be a base station as illustrated in any one or more of FIG. 1 or 2. For instance, network node 1000 may be one of scheduling entities 108. In some examples, network node 1000 may be PLC 804 of FIG. 8.

Network node 1000 may include processing system 1014. Processing system 1014 may have one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, network node 1000 may be configured to perform any one or more of the functions described herein. For example, processors 1004, as utilized in network node 1000, may be configured (e.g., in coordination with a memory 1005) to implement any one or more of the processes and procedures described below and illustrated in FIG. 10.

Processing system 1014 may be implemented with a bus architecture, represented generally by a bus 1002. Bus 1002 may include any quantity of interconnecting buses and bridges depending on the specific application of processing system 1014 and the overall design constraints. Bus 1002 communicatively couples together various circuits including one or more processors (represented generally by the processor 1004), memory 1005, and computer-readable media (represented generally by the computer-readable storage medium 1006). Bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. Transceiver 1010 provides a communication interface or means for communicating with various other apparatus over a transmission medium. Depending upon the nature of the apparatus, a user interface 1012 (e.g., keypad, display, speaker, microphone, joystick) may also be provided. User interface 1012 is optional, and in some examples, such as a base station, user interface 1012 is omitted.

In some aspects of the disclosure, processor 1004 may include resource allocation circuitry 1040 configured (e.g., in coordination with the memory 1005) for various functions. Resource allocation circuitry 1040 may be configured to output, for provision to a device (e.g., a TxUE), an indication of a transmission type in a plurality of transmission types. Each transmission type of the plurality of transmission types is a different pattern of organizing data into mini-slots reserved for sidelink transmission. Resource allocation circuitry 1040 may allocate resources to the device to use for sidelink transmission Processor 1004 may be responsible for managing bus 1002 and general processing, including the execution of software stored on computer-readable storage medium 1006. The software, when executed by processor 1004, causes processing system 1014 to perform the various functions described below for any particular apparatus. Processor 1004 may also use computer-readable storage medium 1006 and memory 1005 for storing data that processor 1004 manipulates when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on computer-readable storage medium 1006. Computer-readable storage medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. Computer-readable storage medium 1006 may reside in processing system 1014, external to processing system 1014, or distributed across multiple entities including processing system 1014. Computer-readable storage medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, computer-readable storage medium 1006 may store computer-executable code that includes resource allocation instructions 1052 that configure network node 1000 for various functions. For example, resource allocation instructions 1052 may configure network node 1000 to output, for provision to a second wireless device (e.g., a TxUE), an indication of a transmission type in a plurality of transmission types. Each transmission type of the plurality of transmission types is a different pattern of organizing data into mini-slots reserved for sidelink transmission. Execution of resource allocation instructions 1052 may cause network node 1000 to allocate resources to the second wireless device to use for sidelink transmission.

In one configuration, a network node 1000 is a wireless communication device that includes means for outputting, for provision to a second wireless device, an indication of a transmission type in a plurality of transmission types, each transmission type of the plurality of transmission types is a different pattern of organizing data into mini-slots reserved for sidelink transmission. Network node 1000 also includes means for allocating resources to the second wireless device to use for sidelink transmission. In one aspect, the aforementioned means for outputting the indication of the transmission type and the aforementioned means for allocating resources may be the processors 1104 shown in FIG. 10 configured to perform the functions recited by the aforementioned means. In another example, the aforementioned means may be a circuit or any apparatus configured to perform the functions recited by the aforementioned means.

In the above examples, the circuitry included in processor 1004 is merely provided as an example, and other means for carrying out the described functions may be included within various aspects of the present disclosure, including but not limited to the instructions stored in computer-readable storage medium 1006, or any other suitable apparatus or means described in any one of the FIGS. 1 and/or 2, and utilizing, for example, the processes and/or algorithms described elsewhere in this disclosure.

Figure 11:
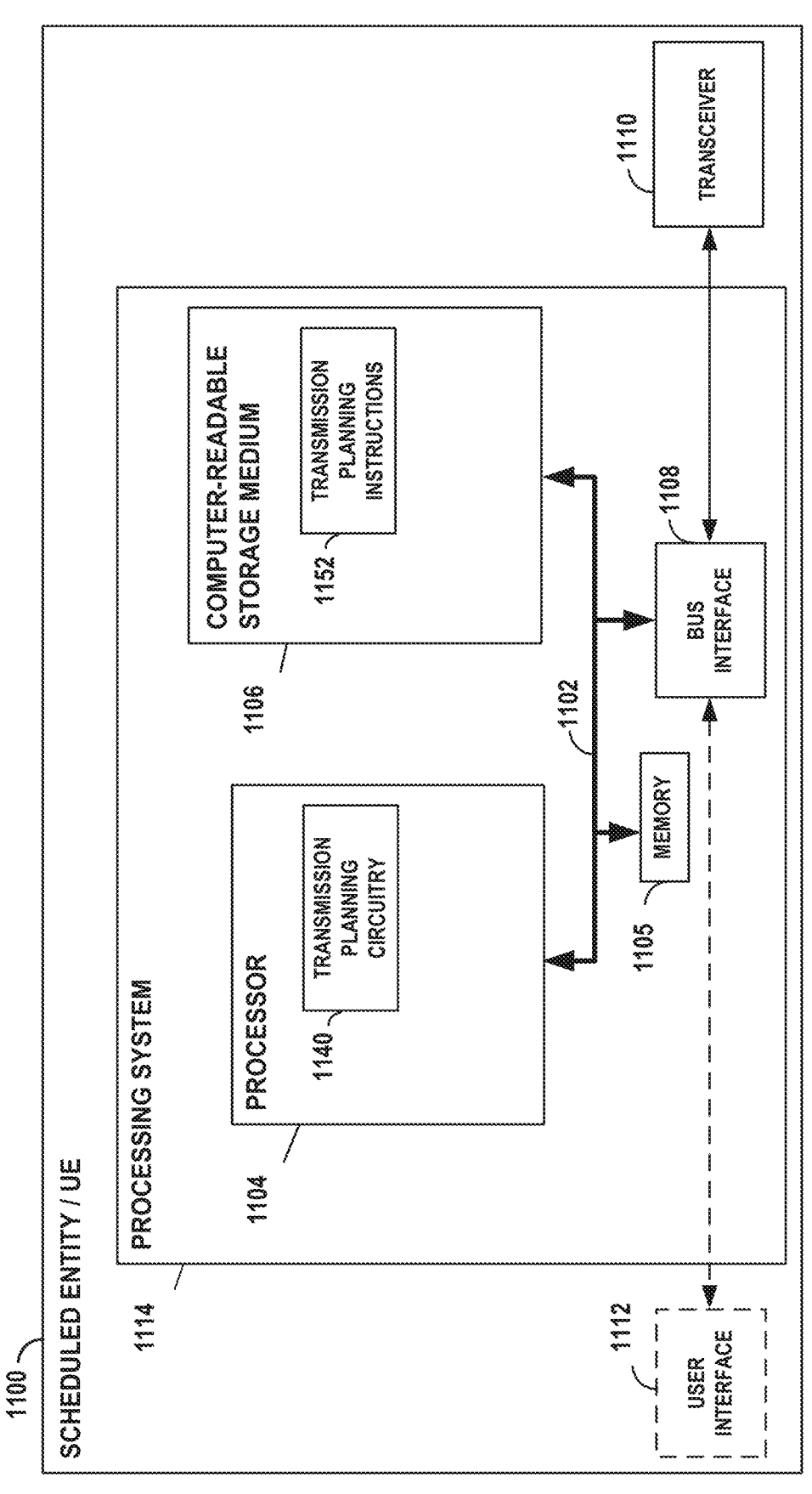
FIG. 11 is a block diagram conceptually illustrating an example of a hardware implementation for a user equipment (UE) according to some aspects of this disclosure.

FIG. 11 is a conceptual diagram illustrating an example of a hardware implementation for an exemplary scheduled entity 1100 employing a processing system 1114. In accordance with various aspects of the disclosure, processing system 1114 may include an element, or any portion of an element, or any combination of elements having one or more processors 1104. For example, scheduled entity 1100 may be a user equipment (UE) as illustrated in any one or more of FIG. 1 or 2.

Processing system 1114 may be substantially the same as processing system 1014 illustrated in FIG. 10, including a bus interface 1108, a bus 1102, memory 1105, one or more processors 1104, and a computer-readable storage medium 1106. Furthermore, scheduled entity 1100 may include a user interface 1112 and a transceiver 1110 substantially similar to those described above in FIG. 10. That is, processors 1104, as utilized in scheduled entity 1100, may be configured (e.g., in coordination with memory 1105) to implement any one or more of the processes described elsewhere in this disclosure.

In some aspects of the disclosure, processors 1104 may include transmission planning circuitry 1140 configured (e.g., in coordination with memory 1105) for various functions. For example, transmission planning circuitry 1140 may determine a transmission type from a plurality of transmission types. Each transmission type of the plurality of transmission types is a different pattern of organizing data into mini-slots reserved for sidelink transmission. Transceiver 1110 may output, for transmission to a second wireless device and according to the determined transmission type, the data in one or more mini-slots reserved for sidelink transmission.

In some examples, transmission planning circuitry 1140 may determine a repetition factor based on a priority, QoS, or remaining PDB corresponding to the data. Transceiver 1110 may repeat the transmission of the data a quantity of times, wherein the quantity of times is based on the repetition factor.

In some examples, computer-readable storage medium 1106 may store computer-executable code that includes transmission planning instructions 1152 that configure a scheduled entity 1100 for various functions. For example, transmission planning instructions 1152 may be configured to cause scheduled entity 1100 to implement one or more of the functions described elsewhere in this disclosure. For example, when executed, transmission planning instructions 1152 may cause processor 1104 to obtain first data. At least one of the following may apply with respect to the first data: the first data is obtained from a second wireless device, the first data indicates reliability or rate requirements, the first data indicates an initial resource pool configuration, or the first data indicates a priority, quality of service (QoS), or remaining packet delay budget (PDB). Execution of transmission planning instructions 1152 may cause processor 1104 to output, for transmission to a second wireless device and according to the determined transmission type, second data in one or more mini-slots reserved for sidelink transmission. The transmission type may be dependent on the first data. Each transmission type of the plurality of transmission types is a different pattern of organizing data into mini-slots reserved for sidelink transmission. The second data may include payload data to convey information to the Rx-UE or another device. For instance, the second data may include encoded voice or video data, webpage request or response data, API request or response data, sensor data, telemetry data, and so on. In some examples, means for obtaining the first data and means for outputting the second data may include one or more processors, such as processor 1104. Other means for carrying out these functions may include any suitable processor that executes instructions stored, e.g., in computer-readable storage medium 1106.

In one configuration, an apparatus (e.g., network node 1000, scheduled entity 1100, etc.) for wireless communication includes means for performing techniques of this disclosure. In one aspect, the aforementioned means may be the processor(s) 1004, 1104 shown in FIG. 10 and FIG. 11 configured to perform the functions recited by the aforementioned means. In another aspect, the aforementioned means may be a circuit or any apparatus configured to perform the functions recited by the aforementioned means.

In the above examples, the circuitry included in processor 1004 is merely provided as an example, and other means for carrying out the described functions may be included within various aspects of the present disclosure, including but not limited to the instructions stored in computer-readable storage medium 1006, or any other suitable apparatus or means described in any one of the FIG. 1 or 2, and utilizing, for example, the processes and/or algorithms described herein in relation to FIGS. 10 and/or 11.

FIG. 12 is a flowchart illustrating an example operation of a transmitting UE (Tx-UE) according to techniques of this disclosure. The Tx-UE may be scheduled entity 106, UE 806, UE 808, scheduled entity 1100, gNB 802, PLC 804, or another device. In the example of FIG. 12, the Tx-UE may obtain first data (1200). In some examples, the Tx-UE obtains the first data from a second wireless device (e.g., an Rx-UE, gNB, a scheduling entity, etc.). In some examples where the Tx-UE obtains the first data from the second wireless device, the first data may identify a transmission type. In some examples, the first data may include one or more of: reliability or rate requirements, the first data comprises an initial resource pool configuration, or the first data comprises a priority, quality of service (QoS), or remaining packet delay budget (PDB) corresponding to the data. The Tx-UE may obtain the first data from a data storage system, from one or more devices, as user input, or otherwise obtain the first data. In some examples, the Tx-UE determines a transmission type from a plurality of transmission types based on the first data. Each transmission type of the plurality of transmission types is a different pattern of organizing data into mini-slots reserved for sidelink transmission.

In some examples, the plurality of transmission types includes two or more of a first transmission type, a second transmission type, or a third transmission type. When the data is transmitted according to the first transmission type, multiple mini-slots of one or more slots are used for transmission of a TB containing the data. When the data is transmitted according to the second transmission type, a TB containing the data is repeated with a same or different RV in different ones of the one or more mini-slots. When the data is transmitted according to the third transmission type, a slot includes a first set of one or more of the mini-slots and a second set of one or more of the mini-slots, the data includes third data and fourth data, and a first TB containing the third data is in the first set of mini-slots and a second TB containing the fourth data is in the second set of mini-slots.

The Tx-UE may determine the transmission type based on an indication obtained by the Tx-UE from a third wireless device. Thus, the Tx-UE may obtain data (e.g., first data) that comprises an indication obtains from a second device (e.g., Tx-UE) that identifies the transmission type. The third wireless device may be sidelink controller, a base station, a primary UE device, or another type of device. In some examples, the indication comprises Radio Resource Control (RRC) data, Media Access Control-Control Element (MAC-CE) data, or Downlink Control Information (DCI) data. In some examples, the Tx-UE may determine the transmission type based on one or more of: reliability or rate requirements corresponding to the data, an initial resource pool configuration, or a priority, quality of service (QoS), or remaining packet delay budget (PDB) corresponding to the data.

Additionally, the Tx-UE may output, for transmission to a receiving wireless device and according to a transmission type in a plurality of transmission types, second data in one or more mini-slots reserved for sidelink transmission (1202). For instance, in an example where the Tx-UE is scheduled entity 1100, transceiver 1110 may output the data for transmission to the receiving wireless device. The transmission type is dependent on the first data. Each transmission type of the plurality of transmission types is a different pattern of organizing data into mini-slots reserved for sidelink transmission. The receiving wireless device may be the same device or a different device from the wireless device from which the first data was obtained. The second data may include payload data to convey information to the Rx-UE or another device. For instance, the second data may include encoded voice or video data, webpage request or response data, API request or response data, sensor data, telemetry data, and so on.

Additionally, in some examples, the Tx-UE may obtain, from the Rx-UE via a physical sidelink feedback channel, an indication of a quantity of repetitions needed to pass a cyclic redundancy check. The Tx-UE may output, for transmission to the Rx-UE, repetitions of the data in the mini-slots according to a repetition factor. The repetition factor is based on the quantity of repetitions needed to pass the cyclic redundancy check.

FIG. 13 is a flowchart illustrating an example operation of a receiving UE (Rx-UE) according to techniques of this disclosure. The Rx-UE may be scheduled entity 106, UE 806, UE 808, scheduled entity 1100, gNB 802, PLC 804, or another device. In the example of FIG. 13, the Rx-UE may output repetition request data for transmission to a second wireless device, the repetition request data indicating a quantity of repetitions of a TB (1300). The second wireless device may be a transmitting UE (Tx-UE). In some examples, the Rx-UE outputs the repetition request data to the second wireless device via a physical sidelink feedback channel. The quantity of repetitions of the TB may be a quantity of repetitions of the TB needed to pass a CRC.

In some examples, the Rx-UE may output, for transmission to the second wireless device, feedback data via a physical sidelink feedback channel, wherein a cyclic shift of a known sequence indicates an ACK or NACK for the data and also the repetition request data. In another example, the Tx-UE may output feedback data for transmission to the Tx-UE via a physical sidelink feedback channel. The feedback data may include a set of RBs that includes at least a first RB and a second RB. The first RB indicates which of an ACK or NACK the feedback data correspond to. The second RB includes the repetition request data indicating a repetition factor. In this example, the Rx-UE may obtain second data in second mini-slots a quantity of times, wherein the quantity of times is based on the repetition factor. The second data may include payload data to convey information to the Rx-UE or another device. For instance, the second data may include encoded voice or video data, webpage request or response data, API request or response data, sensor data, telemetry data, and so on.

The Rx-UE may obtain, from the second wireless device, a set of repetitions of the TB in one or more mini-slots reserved for sidelink transmission (1302). The set of repetitions of the TB includes the quantity of repetitions of the TB. Furthermore, in some examples, the Rx-UE may output a mini-slot indication for transmission to the second wireless device, the mini-slot indication indicating a mini-slot index for retransmission. The Rx-UE may obtain, from the second wireless device, a version of the data having a Redundancy Version (RV) index based on the mini-slot indication.

In some examples, means for outputting repetition request data, feedback data, mini-slot indication may include one or more processors, such as processors 1004 of network device 1000 or processors 1104 of scheduled entity 1100. Similarly, means for obtaining the set of repetitions of the TB or other data may include processors 1004 of network device 1000 or processors 1104 of scheduled entity 1100. Means for obtaining data in mini-slots may include processors 1004 of network device 1000 or processors 1104 of scheduled entity 1100.

FIG. 14 is a flowchart illustrating an example operation of a device according to techniques of this disclosure. The device may be one of scheduling entities 108, gNB 802, PLC 804, network node 1000, or another device. In the example of FIG. 14, the device may output, for provision to a second wireless device, an indication of a transmission type in a plurality of transmission types (1400). For example, the device output the indication to cause a transceiver to send the indication of the transmission type to the second wireless device. The second wireless device may be scheduled entity 106, UE 806, UE 808, scheduled entity 1100, or another device. Each transmission type of the plurality of transmission types is a different pattern of organizing data into mini-slots reserved for sidelink transmission. The transmission types may include any of Transmission Type A, B, or C, as described elsewhere in this disclosure.

The device may allocate resources to the second wireless device to use for sidelink transmission (1402). For example, the device may identify resources and send information identifying the identified resources to the second wireless device.

The following is a non-limiting list of examples in accordance with one or more techniques of this disclosure.

Example 1 is a method of wireless communication at a first wireless device includes obtaining first data, wherein at least one of: the first data is obtained from a second wireless device, the first data indicates reliability or rate requirements, the first data indicates an initial resource pool configuration, the first data indicates a priority, the first data indicates a quality of service (QoS), or the first data indicates a remaining packet delay budget (PDB); outputting, for transmission to a receiving wireless device and according to a transmission type in a plurality of transmission types, second data in one or more mini-slots reserved for sidelink transmission, wherein: the transmission type is dependent on the first data, and each transmission type of the plurality of transmission types is a different pattern of organizing the second data into the one or more mini-slots reserved for sidelink transmission.

Example 2 is the method of example 1, wherein: the plurality of transmission types includes two or more of a first transmission type, a second transmission type, or a third transmission type, when the second data is organized into the mini-slots according to the first transmission type, the one or more mini-slots include multiple mini-slots of one or more slots and are used for transmission of a transport block (TB) containing the second data, when the second data is organized into the mini-slots according to the second transmission type, a TB containing the second data is repeated with a same or different redundancy version (RV) in different ones of the one or more mini-slots, and when the second data is organized into the mini-slots according to the third transmission type, a slot includes a first set of one or more of the mini-slots and a second set of one or more of the mini-slots, the second data includes third data and fourth data, and a first TB containing the third data is in the first set of mini-slots and a second TB containing the fourth data is in the second set of mini-slots.

Example 3 is the method of any of examples 1 and 2, wherein: the first data includes an indication obtained from the second wireless device that identifies the transmission type, and the second wireless device is one of: a sidelink controller, a base station, or a primary User Equipment (UE) device.

Example 4 is the method of example 3, wherein the indication comprises Radio Resource Control (RRC) data, Media Access Control-Control Element (MAC-CE) data, or Downlink Control Information (DCI) data.

Example 5 is the method of any of examples 1 through 4, wherein the method further comprises outputting for transmission repetitions of the second data a quantity of times, wherein the quantity of the repetitions is based on the priority, QoS, or remaining PDB.

Example 6 is the method of any of examples 1 through 5, wherein the method further comprises: outputting for transmission repetitions of the second data a first quantity of times, wherein the first quantity of times is based on a first repetition factor, wherein the first repetition factor is based on Logical Channel Group (LCG) priority or Quality of Service (QoS) of the second data; obtaining feedback from the receiving wireless device; and outputting for transmission repetitions of third data a second quantity of times, wherein the second quantity of times is based on a second repetition factor, wherein the second repetition factor is based on the feedback from the receiving wireless device and a PDB deadline of a packet containing the third data.

Example 7 is the method of any of examples 1 through 6, wherein outputting the second data comprises outputting for transmission repetitions of the second data in the mini-slots according to a repetition factor based on a quantity of Negative Acknowledgments (NACKs) in a set of one or more NACKs obtained within a time interval.

Example 8 is the method of any of examples 1 through 7, wherein: the method further comprises obtaining, from the receiving wireless device via a physical sidelink feedback channel, an indication of a quantity of repetitions needed to pass a cyclic redundancy check, and outputting the second data comprises outputting, for transmission to the receiving wireless device, repetitions of the second data in the mini-slots according to a repetition factor, wherein the repetition factor is based on the quantity of repetitions needed to pass the cyclic redundancy check.

Example 9 is the method of any of examples 1 through 8, wherein: the mini-slots are first mini-slots, and the method further comprises: obtaining feedback data from the receiving wireless device via a physical sidelink feedback channel, wherein the feedback data has a cyclic shift that identifies which of an acknowledgement (ACK) or negative acknowledgment (NACK) the feedback data correspond to; outputting for transmission repetitions of third data in second mini-slots a specific quantity of times, wherein the specific quantity of times is based on the cyclic shift of the feedback data.

Example 10 is the method of any of examples 1 through 9, wherein: the mini-slots are first mini-slots, and the method further comprises: obtaining feedback data from the receiving wireless device via a physical sidelink feedback channel, the feedback data including a set of Resource Blocks (RBs) that includes at least a first RB and a second RB, wherein the first RB indicates which of an acknowledgement (ACK) or negative acknowledgment (NACK) the feedback data correspond to; and outputting, for transmission to the receiving wireless device, repetitions of third data in second mini-slots a quantity of times, wherein the quantity of times is based on a repetition factor, and the repetition factor is based on the second RB.

Example 11 is the method of any of examples 1 through 10, further includes obtaining a mini-slot indication from the receiving wireless device, the mini-slot indication indicating a mini-slot index for retransmission; and outputting, for transmission to the receiving wireless device, a version of the second data having a Redundancy Version (RV) index based on the mini-slot indication.

Example 12 is the method of any of examples 1 through 11, further includes obtaining first physical sidelink feedback channel (PSFCH) data formatted in a first PSFCH format, the first PSFCH data indicating an acknowledgment (ACK) or negative acknowledgment (NACK); obtaining second PSFCH data formatted in a second PSFCH format different from the first PSFCH format, the second PSFCH data bits indicating a repetition factor; and outputting, for transmission to the receiving wireless device, repetitions of the second data in the mini-slots according to the repetition factor.

Example 13 is a method of wireless communication at a first wireless device includes providing, to a second wireless device, an indication of a transmission type in a plurality of transmission types, each transmission type of the plurality of transmission types is a different pattern of organizing data into mini-slots reserved for sidelink transmission; and allocating resources to the second wireless device to use for sidelink transmission.

Example 14 is the method of example 13, wherein: the plurality of transmission types includes two or more of a first transmission type, a second transmission type, or a third transmission type, when the second data is organized into the mini-slots according to the first transmission type, the one or more mini-slots include multiple mini-slots of one or more slots and are used for transmission of a transport block (TB) containing the second data, when the second data is organized into the mini-slots according to the second transmission type, a TB containing the second data is repeated with a same or different redundancy version (RV) in different ones of the one or more mini-slots, and when the second data is organized into the mini-slots according to the third transmission type, a slot includes a first set of one or more of the mini-slots and a second set of one or more of the mini-slots, the second data includes third data and fourth data, and a first TB containing the third data is in the first set of mini-slots and a second TB containing the fourth data is in the second set of mini-slots.

Example 15 is a method of wireless communication at a first wireless device includes outputting repetition request data for transmission to a second wireless device, the repetition request data indicating a quantity of repetitions of a transport block (TB); and obtaining, from the second wireless device, a set of repetitions of the TB in one or more mini-slots reserved for sidelink transmission, wherein the set of repetitions of the TB includes the quantity of repetitions of the TB.

Example 16 is the method of example 15, wherein outputting the repetition request data for transmission to the second wireless device comprises outputting the repetition request data for transmission to the second wireless device via a physical sidelink feedback channel.

Example 17 is the method of any of examples 15 and 16, wherein the quantity of repetitions of the TB is a quantity of repetitions of the TB needed to pass a cyclic redundancy check.

Example 18 is the method of any of examples 15 through 17, wherein outputting the repetition request data for transmission to the second wireless device comprising outputting, for transmission to the second wireless device, feedback data via a physical sidelink feedback channel, wherein a cyclic shift of the feedback data indicates an acknowledgement (ACK) or NACK for the data and also the repetition request data.

Example 19 is the method of any of examples 15 through 18, wherein: the data is first data, the mini-slots are first mini-slots, outputting the repetition request data comprises outputting feedback data for transmission to the second wireless device via a physical sidelink feedback channel, the feedback data including a set of Resource Blocks (RBs) that includes at least a first RB and a second RB, the first RB indicating which of an acknowledgement (ACK) or NACK the feedback data correspond to, and the second RB including the repetition request data indicating a repetition factor, and the method further comprises obtaining second data in second mini-slots a quantity of times, wherein the quantity of times is based on the repetition factor.

Example 20 is the method of any of examples 15 through 19, wherein the method further comprises: outputting a mini-slot indication for transmission to the second wireless device, the mini-slot indication indicating a mini-slot index for retransmission; and obtaining, from the second wireless device, a version of the data having a Redundancy Version (RV) index based on the mini-slot indication.

Example 21 is an apparatus for wireless communication that includes one or more processors; and a memory that includes instructions executable by the one or more processors, wherein the one or more processors are configured to execute the instructions to cause the apparatus to perform a method in accordance with any one of examples 1-12.

Example 22 is a user equipment (UE) that includes a transceiver, one or more processors, and a memory that includes instructions executable by the one or more processors, wherein the one or more processors are configured to execute the instructions to cause the UE to perform a method in accordance with any one of examples 1-12, wherein the transceiver is configured to obtain the first data and transmit the second data.

Example 23 is the UE of example 22, wherein the UE is a vehicle.

Example 24 is an apparatus for wireless communication that includes one or more processors; and a memory that includes instructions executable by the one or more processors, wherein the one or more processors are configured to execute the instructions to cause the apparatus to perform a method in accordance with any one of examples 13-14.

Example 25 is a base station that includes a transceiver, one or more processors, and a memory that includes instructions executable by the one or more processors, wherein the one or more processors are configured execute the instructions to cause the base station to perform a method in accordance with any one of examples 13-14, wherein the transceiver is configured to output the indication of the transmission type.

Example 26 is an apparatus for wireless communication that includes one or more processors; and a memory that includes instructions executable by the one or more processors, wherein the one or more processors are configured for performing a method in accordance with any one of examples 15-20.

Example 27 is a UE that includes a transceiver, one or more processors, and a memory that includes instructions executable by the one or more processors, wherein the one or more processors are configured to execute the instructions to cause the UE to perform a method in accordance with any one of examples 15-20, and wherein the transceiver is configured to output the repetition request data and obtain the set of repetitions.

Example 28 is the UE of example 25, wherein the UE is a vehicle.

Example 29 is an apparatus for wireless communication that includes means for performing a method in accordance with any one of examples 1-12.

Example 30 is an apparatus for wireless communication that includes means for performing a method in accordance with any one of examples 13-14.

Example 31 is an apparatus for wireless communication that includes means for performing a method in accordance with any one of examples 15-20.

Example 32 is a non-transitory computer-readable medium comprising instructions that, when executed by an apparatus, cause the apparatus to perform a method in accordance with any one of examples 1-12.

Example 33 is a non-transitory computer-readable medium comprising instructions that, when executed by an apparatus, cause the apparatus to perform a method in accordance with any one of examples 13-14.

Example 34 is a non-transitory computer-readable medium comprising instructions that, when executed by an apparatus, cause the apparatus to perform a method in accordance with any one of examples 15-20.

The detailed description set forth above in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes certain aspects and examples with reference to some illustrations, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, end-user devices, etc. of varying sizes, shapes and constitution.

By way of example, various aspects of this disclosure may be implemented within systems defined by 3GPP, such as fifth-generation New Radio (5G NR), Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

The present disclosure uses the word "exemplary" to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The present disclosure uses the terms "coupled" and/or "communicatively coupled" to refer to a direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The present disclosure uses the terms "circuit" and "circuitry" broadly, to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Applicant provides this description to enable any person skilled in the art to practice the various aspects described herein. Those skilled in the art will readily recognize various modifications to these aspects, and may apply the generic principles defined herein to other aspects. Applicant does not intend the claims to be limited to the aspects shown herein, but to be accorded the full scope consistent with the language of the claims, wherein reference to an element in the singular is not intended to mean "one and only one" unless specifically so stated, but rather "one or more." Unless specifically stated otherwise, the present disclosure uses the term "some" to refer to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
at least one transceiver;
one or more processors; and
at least one memory storing instructions, wherein the one or more processors are configured to execute the instructions to cause the apparatus to:
receive, via the at least one transceiver, first data, wherein at least one of:
the first data is received from a second wireless device,
the first data indicates reliability or rate requirements,
the first data indicates an initial resource pool configuration,
the first data indicates a priority,
the first data indicates a quality of service (QoS), or
the first data indicates a remaining packet delay budget (PDB);
transmit, via the at least one transceiver, to a receiving wireless device and according to a transmission type in a plurality of transmission types, second data in one or more mini-slots reserved for sidelink transmission, wherein:
the transmission type is dependent on the first data, and
each transmission type of the plurality of transmission types is a different pattern of organizing the second data into the one or more mini-slots reserved for sidelink transmission.

2. The apparatus of claim 1, wherein:

the plurality of transmission types includes two or more of a first transmission type, a second transmission type, or a third transmission type, when the second data is organized into the one or more mini-slots according to the first transmission type, the one or more mini-slots include multiple mini-slots of one or more slots and are used for transmission of a transport block (TB) containing the second data, when the second data is organized into the one or more mini-slots according to the second transmission type, the one or more mini-slots include multiple mini-slots and a TB containing the second data is repeated with a same or different redundancy version (RV) in different ones of the mini-slots, and when the second data is organized into the one or more mini-slots according to the third transmission type, the one or more mini-slots includes a first set of one or more mini-slots and a second set of the one or more mini-slots and a slot includes the first set of one or more mini-slots and the second set of one or more mini-slots, the second data includes third data and fourth data, and a first TB containing the third data is in the first set of one or more mini-slots and a second TB containing the fourth data is in the second set of one or more mini-slots.

3. The apparatus of claim 1, wherein:

the first data comprises an indication received from the second wireless device that identifies the transmission type, and the second wireless device is one of: a sidelink controller, a base station, or a primary User Equipment (UE) device.

4. The apparatus of claim 3, wherein the indication comprises Radio Resource Control (RRC) data, Media Access Control-Control Element (MAC-CE) data, or Downlink Control Information (DCI) data.

5. The apparatus of claim 1, wherein the execution of the instructions by the one or more processors further causes the apparatus to transmit, via the at least one transceiver, repetitions of the second data, wherein a quantity of the repetitions is based on the priority, the QoS, or the remaining PDB.

6. The apparatus of claim 1, wherein the execution of the instructions by the one or more processors further causes the apparatus to:

transmit, via the at least one transceiver, repetitions of the second data a first quantity of times, wherein the first quantity of times is based on a first repetition factor, wherein the first repetition factor is based on Logical Channel Group (LCG) priority or Quality of Service (QoS) of the second data;

receive, via the at least one transceiver, feedback from the receiving wireless device; and transmit, via the at least one transceiver, repetitions of third data a second quantity of times, wherein the second quantity of times is based on a second repetition factor, wherein the second repetition factor is based on the feedback from the receiving wireless device and a PDB deadline of a packet containing the third data.

7. The apparatus of claim 1, wherein the execution of the instructions by the one or more processors further causes the apparatus to transmit, via the at least one transceiver, repetitions of the second data in one or more additional mini-slots according to a repetition factor based on a quantity of Negative Acknowledgments (NACKs) in a set of one or more NACKs received within a time interval.

8. The apparatus of claim 1, wherein the execution of the instructions by the one or more processors further causes the apparatus to:

receive, via the at least one transceiver, from the receiving wireless device and via a physical sidelink feedback channel, an indication of a quantity of repetitions needed to pass a cyclic redundancy check, and transmit, via the at least one transceiver and to the receiving wireless device, repetitions of the second data in one or more additional mini-slots according to a repetition factor, wherein the repetition factor is based on the quantity of repetitions needed to pass the cyclic redundancy check.

9. The apparatus of claim 1, wherein:

the one or more mini-slots are one or more first mini-slots, and the execution of the instructions by the one or more processors further causes the apparatus to:

receive, via the at least one transceiver, from the receiving wireless device and via a physical sidelink feedback channel, feedback data, wherein the feedback data has a cyclic shift that identifies which of an acknowledgement (ACK) or negative acknowledgment (NACK) the feedback data correspond to; and transmit, via the at least one transceiver, repetitions of third data in second mini-slots a specific quantity of times, wherein the specific quantity of times is based on the cyclic shift of the feedback data.

10. The apparatus of claim 1, wherein:

the one or more mini-slots are one or more first mini-slots, the execution of the instructions by the one or more processors further causes the apparatus to:

receive, via the at least one transceiver, from the receiving wireless device and via a physical sidelink feedback channel, the feedback data including a set of Resource Blocks (RBs) that includes at least a first RB and a second RB, wherein the first RB indicates which of an acknowledgement (ACK) or negative acknowledgment (NACK) the feedback data correspond to; and transmit, via the at least one transceiver and to the receiving wireless device, repetitions of third data in second mini-slots a quantity of times, wherein the quantity of times is based on a repetition factor, and the repetition factor is based on the second RB.

11. The apparatus of claim 1, wherein the execution of the instructions by the one or more processors further causes the apparatus to:

receive, via the at least one transceiver, a mini-slot indication from the receiving wireless device, the mini-slot indication indicating a mini-slot index for retransmission; and transmit, via the at least one transceiver and to the receiving wireless device, a version of the second data having a Redundancy Version (RV) index based on the mini-slot indication.

12. The apparatus of claim 1, wherein the execution of the instructions by the one or more processors further causes the apparatus to:

receive, via the at least one transceiver, first physical sidelink feedback channel (PSFCH) data formatted in a first PSFCH format, the first PSFCH data indicating an acknowledgment (ACK) or negative acknowledgment (NACK);

receive, via the at least one transceiver, second PSFCH data formatted in a second PSFCH format different from the first PSFCH format, the second PSFCH data indicating a repetition factor; and transmit, via the at least one transceiver and to the receiving wireless device, repetitions of the second data in the mini-slots according to the repetition factor.

13. The apparatus of claim 1, wherein the apparatus is configured as a scheduled entity, a user equipment (UE), or a programmable logic controller (PLC).

14. An apparatus for wireless communication, comprising:

one or more processors; and at least one memory storing instructions, wherein the one or more processors are configured to execute the instructions to cause the apparatus to:

transmit, via the at least one transceiver and to a second wireless device, an indication of a transmission type of a plurality of transmission types, each transmission type of the plurality of transmission types is a different pattern of organizing data into mini-slots reserved for sidelink transmission; and allocate resources to be used for sidelink communication by the second wireless device.

15. The apparatus of claim 14, wherein:

the plurality of transmission types includes two or more of a first transmission type, a second transmission type, or a third transmission type, when the data is organized into the mini-slots according to the first transmission type, the mini-slots include multiple mini-slots of one or more slots and are used for transmission of a transport block (TB) containing the data, when the data is organized into the mini-slots according to the second transmission type, a TB containing the data is repeated with a same or different redundancy version (RV) in different ones of the mini-slots, and when the data is organized into the mini-slots according to the third transmission type, a slot includes a first set of one or more of the mini-slots and a second set of one or more of the mini-slots, the data includes second data and third data, and a first TB containing the second data is in the first set of mini-slots and a second TB containing the third data is in the second set of mini-slots.

16. The apparatus of claim 14, further comprising a transceiver configured to transmit the indication of the transmission type to the second wireless device, wherein the apparatus is configured as a gNode B (gNB), a scheduling entity, or a network node.

17. An apparatus for wireless communication, comprising:

at least one transceiver;

one or more processors; and at least one memory storing instructions, wherein the one or more processors are configured execute the instructions to cause the apparatus to:

transmit, via the at least one transceiver and to a second wireless device, repetition request data indicating a quantity of repetitions of a transport block (TB); and receive, via the at least one transceiver and from the second wireless device, a set of repetitions of the TB in one or more mini-slots reserved for sidelink transmission, wherein the set of repetitions of the TB includes the quantity of repetitions of the TB.

18. The apparatus of claim 17, wherein the execution of the instructions by the one or more processors further causes the apparatus to transmit, via the at least one transceiver, the repetition request data to the second wireless device via a physical sidelink feedback channel.

19. The apparatus of claim 17, wherein the quantity of repetitions of the TB is a quantity of repetitions of the TB needed to pass a cyclic redundancy check.

20. The apparatus of claim 17, wherein the execution of the instructions by the one or more processors further causes the apparatus to transmit, via the at least one transceiver and to the second wireless device, feedback data via a physical sidelink feedback channel, wherein a cyclic shift of the feedback data indicates an acknowledgement (ACK) or negative acknowledgement (NACK) for data and also the repetition request data.

21. The apparatus of claim 17, wherein:

the data is first data, the mini-slots are first mini-slots, the execution of the instructions by the one or more processors further causes the apparatus to transmit, via the at least one transceiver, feedback data to the second wireless device via a physical sidelink feedback channel, the feedback data including a set of Resource Blocks (RBs) that includes at least a first RB and a second RB, the first RB indicating which of an acknowledgement (ACK) or negative acknowledgement (NACK) the feedback data correspond to, and the second RB including the repetition request data indicating a repetition factor, and the execution of the instructions by the one or more processors further causes the apparatus to receive, via the at least one transceiver, second data in second mini-slots a quantity of times, wherein the quantity of times is based on the repetition factor.

22. The apparatus of claim 17, wherein the execution of the instructions by the one or more processors further causes the apparatus to:

transmit, via the at least one transceiver, a mini-slot indication for transmission to the second wireless device, the mini-slot indication indicating a mini-slot index for retransmission; and receive, via the at least one transceiver and from the second wireless device, a version of the data having a Redundancy Version (RV) index based on the mini-slot indication.

23. The apparatus of claim 17, wherein the apparatus is configured as a scheduled entity, a user equipment (UE), or a programmable logic controller (PLC).

* * * * *